United States Patent
Chen et al.

(10) Patent No.: US 9,516,260 B2
(45) Date of Patent: Dec. 6, 2016

(54) VIDEO PROCESSING METHOD AND APPARATUS

(71) Applicant: Huawei Technologies Co., Ltd., Shenzhen (CN)

(72) Inventors: Hai Chen, Shenzhen (CN); Fengwei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/601,722

(22) Filed: Jan. 21, 2015

(65) Prior Publication Data
US 2015/0208025 A1    Jul. 23, 2015

(30) Foreign Application Priority Data

Jan. 21, 2014 (CN) .......................... 2014 1 0028415

(51) Int. Cl.
*H04N 7/01* (2006.01)
*H04N 11/20* (2006.01)
(Continued)

(52) U.S. Cl.
CPC ............ *H04N 7/012* (2013.01); *H04N 7/0125* (2013.01); *H04N 7/0142* (2013.01); *H04N 7/0157* (2013.01); *H04N 9/78* (2013.01)

(58) Field of Classification Search
CPC .......... H04N 7/01; H04N 7/00; H04N 7/012; H04N 7/0157; H04N 7/0125; H04N 7/015; H04N 7/0142; H04N 11/20; H04N 9/78
USPC .......................... 348/452, 441, 448, 538, 701
See application file for complete search history.

(56) References Cited

U.S. PATENT DOCUMENTS

| 6,822,691 | B1 * | 11/2004 | Kim ....................... H04N 5/144 348/451 |
| 8,243,814 | B2 | 8/2012 | Matsuoka et al. |
| 8,289,452 | B2 | 10/2012 | Chen et al. |

(Continued)

FOREIGN PATENT DOCUMENTS

| CN | 101189871 A | 5/2008 |
| CN | 101322400 A | 12/2008 |
| WO | 2006126169 A2 | 11/2006 |

OTHER PUBLICATIONS

Haan, G., et al., "Deinterlacing—An Overview," XP000850198, Proceedings of the IEEE, vol. 86, No. 9, Sep. 1998, pp. 1839-1857.
(Continued)

*Primary Examiner* — Trang U Tran
(74) *Attorney, Agent, or Firm* — Conley Rose, P.C.

(57) ABSTRACT

A video processing method and apparatus, which relate to the field of multimedia, and the method includes acquiring, by an video processing apparatus, two field images of an interlaced frame image in an interlaced video; performing temporal deinterlacing on either field image in the two field images to obtain a temporal virtual field image, and performing spatial deinterlacing on the either field image to obtain a spatial virtual field image; performing directional combing detection on the temporal virtual field image along a preset candidate combing detection direction with reference to the other field image in the interlaced frame image, to determine whether combing exists in the temporal virtual field image; and according to this, selecting the temporal virtual field image or the spatial virtual field image to be fused with the other field image to generate a new image.

15 Claims, 14 Drawing Sheets

(51) Int. Cl.
*H04N 7/015* (2006.01)
*H04N 9/78* (2006.01)

(56) References Cited

U.S. PATENT DOCUMENTS

| | | | | |
|---|---|---|---|---|
| 8,704,945 B1* | 4/2014 | Xin | ................ | H04N 7/012 348/452 |
| 8,964,116 B2* | 2/2015 | Bellers | ............ | H04N 7/0142 348/441 |
| 2006/0158550 A1* | 7/2006 | Zhou | ................ | H04N 5/144 348/452 |
| 2007/0206117 A1* | 9/2007 | Tian | ................ | H04N 7/012 348/452 |
| 2010/0157147 A1 | 6/2010 | Bellers | | |

OTHER PUBLICATIONS

Foreign Communication From a Counterpart Application, European Application No. 15151902.2, Extended European Search Report dated May 21, 2015, 7 pages.
Foreign Communication From A Counterpart Application, Chinese Application No. 201410028415.X, Chinese Office Action dated Aug. 4, 2016, 7 pages.

* cited by examiner

VIDEO PROCESSING METHOD AND APPARATUS

CROSS-REFERENCE TO RELATED APPLICATION

This application claims priority to Chinese Patent Application No. 201410028415.X, filed on Jan. 21, 2014, which is hereby incorporated by reference in its entirety.

TECHNICAL FIELD

The present invention relates to the field of multimedia, and in particular, to a video processing method and apparatus.

BACKGROUND

At present, videos of broadcast television and films have video formats classified into an interlaced format and a progressive format. In an interlaced video, each frame image is divided, based on an odd-numbered line sequence and an even-numbered line sequence, into two fields, namely, a top field and a bottom field. In the standard definition era, standard definition formats in Chinese broadcast films and television all use interlaced sources. In the high-definition era, there are also a large number of interlaced high-definition videos. An advantage of an interlaced video is that temporal sampling points are doubled so that pictures are more consecutive and smoother. For example, compared with an National Television System Committee (NTSC) system progressive video having 30 frames per second, a phase alteration line (PAL) system interlaced video having 25 frames and 50 fields per second is more consecutive and smoother, but has slightly lower picture quality.

With the development of science and technology, cathode ray tube (CRT) televisions and displays that are based on vacuum tubes and electron guns and can directly support interlaced scanning have been replaced by televisions and displays in a progressive display mode such as liquid crystal and plasma. Therefore, video deinterlacing is very important in video postprocessing. Due to different temporal sampling time in an interlaced video, there is always relative motion between fields. If a top field and a bottom field of a same frame image are directly interlaced and combined, obvious combing occurs in the image. In an existing method, video deinterlacing processing is performed using a linearization method, a directional interpolation method, a spatial adaptation method, a motion compensation method, and a motion compensation assisted spatial adaptation method. However, these methods cannot ensure that there is neither loss nor combing in high-frequency signals in a perpendicular direction in a new image obtained after deinterlacing is performed on an interlaced frame image in an interlaced video.

SUMMARY

Embodiments of the present invention provide a video processing method and apparatus. The method and apparatus can ensure that there is neither loss nor combing in high-frequency signals in a perpendicular direction in a new image obtained after deinterlacing is performed on an interlaced frame image in an interlaced video.

To achieve the foregoing objective, the embodiments of the present invention adopt the following technical solutions.

According to a first aspect, a video processing method is provided and includes acquiring, by a video processing apparatus, field images of an interlaced frame image, where the interlaced frame image is an interlaced video frame image, and the interlaced video frame image includes two field images; performing, by the video processing apparatus, temporal deinterlacing on either field image in the two field images to obtain a temporal virtual field image; performing, by the video processing apparatus, spatial deinterlacing on the either field image to obtain a spatial virtual field image; performing, by the video processing apparatus, directional combing detection on the temporal virtual field image along a preset candidate combing detection direction with reference to the other field image in the two field images of the interlaced frame image, to determine whether combing exists in the temporal virtual field image; and selecting, by the video processing apparatus according to a result of the directional combing detection, the temporal virtual field image or the spatial virtual field image to be fused with the other field image to generate a frame image.

With reference to the first aspect, in a first possible implementation manner, the performing, by the video processing apparatus, directional combing detection on the temporal virtual field image along a preset candidate combing detection direction with reference to the other field image in the interlaced frame image, to determine whether combing exists in the temporal virtual field image includes calculating, by the video processing apparatus, a candidate combing detection direction of the temporal virtual field image with reference to the other field image in the interlaced frame image, where the candidate combing detection direction includes an edge direction or a texture direction of each pixel location in the temporal virtual field image; calculating, by the video processing apparatus, a combing intensity value of a preset sampling pixel location along the candidate combing detection direction with reference to the other field image and the temporal virtual field image; and determining, by the video processing apparatus according to the combing intensity value, whether combing exists in the temporal virtual field image, where if the number of the sampling pixel locations of which the combing intensity value is consecutively greater than a preset threshold exceeds a preset number, or the number of the sampling pixel locations of which the combing intensity value is consecutively less than a preset threshold exceeds a preset number, the video processing apparatus determines that combing exists in the temporal virtual field image; or if the number of the sampling pixel locations of which the combing intensity value is consecutively greater than a preset threshold does not exceed a preset number, or the number of the sampling pixel locations of which the combing intensity value is consecutively less than a preset threshold does not exceed a preset number, the video processing apparatus determines that combing does not exist in the temporal virtual field image.

With reference to the first aspect, in a second possible implementation manner, the performing, by the video processing apparatus, directional combing detection on the temporal virtual field image along a preset candidate combing detection direction with reference to the other field image in the interlaced frame image, to determine whether combing exists in the temporal virtual field image includes acquiring, by the video processing apparatus from a spatial deinterlacing result of the either field image, an edge detection result of the spatial virtual field image as a candidate combing detection direction of the temporal virtual field image, where the candidate combing detection direction includes an edge direction or a texture direction of each pixel location in the temporal virtual field image; calculating, by the video processing apparatus, a combing intensity value of a preset sampling pixel location along the candidate combing detection direction with reference to the other field image and the temporal virtual field image; and determining, by the video processing apparatus according to the combing intensity value, whether combing exists in the temporal virtual field image, where if the number of the sampling pixel locations of which the combing intensity value is consecutively greater than a preset threshold exceeds a preset number, or the number of the sampling pixel locations of which the combing intensity value is consecutively less than a preset threshold exceeds a preset number, the video processing apparatus determines that combing exists in the temporal virtual field image; or if the number of the sampling pixel locations of which the combing intensity value is consecutively greater than a preset threshold does not exceed a preset number, or the number of the sampling pixel locations of which the combing intensity value is consecutively less than a preset threshold does not exceed a preset number, the video processing apparatus determines that combing does not exist in the temporal virtual field image.

With reference to the first or second possible implementation manner, in a third possible implementation manner, before the performing, by the video processing apparatus, directional combing detection on the temporal virtual field image along a preset candidate combing detection direction with reference to the other field image in the interlaced frame image, to determine whether combing exists in the temporal virtual field image, the method further includes acquiring, by the video processing apparatus, motion information between the two field images of the interlaced frame image; and the performing, by the video processing apparatus, directional combing detection on the temporal virtual field image with reference to the other field image in the interlaced frame image, to determine whether combing exists in the temporal virtual field image further includes determining, by the video processing apparatus, a motion state of the field images according to the motion information; and when the video processing apparatus determines according to the combing intensity value that combing exists in the temporal virtual field image, determining, by the video processing apparatus, genuineness of the combing in combination with a determining result of the motion state, where if the motion state is moving, the video processing apparatus determines that the combing is genuine combing, and that combing exists in the temporal virtual field image; or if the motion state is still, the video processing apparatus determines that the combing is pseudo combing, and that combing does not exist in the temporal virtual field image.

With reference to any implementation manner of the first to the third possible implementation manners of the first aspect, in a fourth possible implementation manner, the selecting, by the video processing apparatus according to a result of the directional combing detection, the temporal virtual field image or the spatial virtual field image to be fused with the other field image to generate a new image includes, if the result of the directional combing detection is that the combing exists, selecting, by the video processing apparatus, the spatial virtual field image to be fused with the other field image to obtain the new image; or if the result of the directional combing detection is that the combing does not exist, selecting, by the video processing apparatus, the temporal virtual field image to be fused with the other field image to obtain the new image.

With reference to the first aspect and any possible implementation manner of the first to fourth possible implementation manners, in a fifth possible implementation manner, the field images include a top field image and a bottom field image.

With reference to the first aspect and any possible implementation manner of the first to fourth possible implementation manners, in a sixth possible implementation manner, the performing temporal deinterlacing on either field image in the two field images to obtain a temporal virtual field image includes performing field duplication deinterlacing on either field image in the two field images to obtain a temporal virtual field image, or, performing field averaging deinterlacing on either field image in the two field images to obtain a temporal virtual field image, or, performing motion compensation deinterlacing on either field image in the two field images to obtain a temporal virtual field image.

With reference to the first aspect and any possible implementation manner of the first to fourth possible implementation manners, in a seventh possible implementation manner, the spatial deinterlacing includes spatial linear interpolation deinterlacing and spatial directional interpolation deinterlacing.

According to a second aspect, a video processing apparatus is provided and includes an acquiring unit configured to acquire field images of an interlaced frame image, where the interlaced frame image is an interlaced video frame image, and the interlaced video frame image includes two field images; a temporal processing unit configured to perform temporal deinterlacing on either field image in the two field images acquired by the acquiring unit, to obtain a temporal virtual field image; a spatial processing unit configured to perform spatial deinterlacing on the either field image acquired by the acquiring unit, to obtain a spatial virtual field image; a detecting unit configured to perform directional combing detection on the temporal virtual field image along a preset candidate combing detection direction with reference to the other field image in the two field images of the interlaced frame image, which are acquired by the acquiring unit, to determine whether combing exists in the temporal virtual field image obtained after the temporal deinterlacing by the temporal processing unit, where the temporal virtual field image is obtained after the temporal deinterlacing is performed by the temporal processing unit; and a fusing unit configured to select, according to a result of the directional combing detection by the detecting unit, the temporal virtual field image obtained after the temporal deinterlacing by the temporal processing unit or the spatial virtual field image obtained after the spatial deinterlacing by the spatial processing unit, to be fused with the other field image acquired by the acquiring unit, to generate a new image.

With reference to the second aspect, in a first possible implementation manner, the detecting unit includes a direction calculating subunit configured to calculate, with reference to the other field image in the interlaced frame image, which is acquired by the acquiring unit, a candidate combing detection direction of the temporal virtual field image obtained after the temporal deinterlacing by the temporal processing unit, where the candidate combing detection direction includes an edge direction or a texture direction of each pixel location in the temporal virtual field image obtained after the temporal deinterlacing by the temporal processing unit; an intensity calculating subunit configured to calculate a combing intensity value of a preset sampling pixel location along the candidate combing detection direction with reference to the other field image acquired by the acquiring unit and the temporal virtual field image obtained after the temporal deinterlacing by the temporal processing unit, where the candidate combing detection direction is obtained through calculation by the direction calculating subunit; and a combing determining subunit configured to determine, according to the combing intensity value obtained through calculation by the intensity calculating subunit, whether combing exists in the temporal virtual field image obtained after the temporal deinterlacing by the temporal processing unit, where if the number of the sampling pixel locations of which the combing intensity value obtained through calculation by the intensity calculating subunit is consecutively greater than a preset threshold exceeds a preset number, or the number of the sampling pixel locations of which the combing intensity value obtained through calculation by the intensity calculating subunit is consecutively less than a preset threshold exceeds a preset number, the combing determining subunit determines that combing exists in the temporal virtual field image obtained after the temporal deinterlacing by the temporal processing unit; or if the number of the sampling pixel locations of which the combing intensity value obtained through calculation by the intensity calculating subunit is consecutively greater than a preset threshold does not exceed a preset number, or the number of the sampling pixel locations of which the combing intensity value obtained through calculation by the intensity calculating subunit is consecutively less than a preset threshold does not exceed a preset number, the combing determining subunit determines that combing does not exist in the temporal virtual field image obtained after the temporal deinterlacing by the temporal processing unit.

With reference to the second aspect, in a second possible implementation manner, the detecting unit includes a direction acquiring subunit configured to acquire, from a spatial deinterlacing result, which is obtained by the spatial processing unit, an edge detection result of the spatial virtual field image as a candidate combing detection direction of the temporal virtual field image obtained after the temporal deinterlacing by the temporal processing unit, where the candidate combing detection direction includes an edge direction or a texture direction of each pixel location in the temporal virtual field image; an intensity calculating subunit configured to calculate a combing intensity value of a preset sampling pixel location along the candidate combing detection direction with reference to the other field image acquired by the acquiring unit and the temporal virtual field image obtained after the temporal deinterlacing by the temporal processing unit, where the candidate combing detection direction is obtained by the spatial processing unit; and a combing determining subunit configured to determine, according to the combing intensity value obtained through calculation by the intensity calculating subunit, whether combing exists in the temporal virtual field image obtained after the temporal deinterlacing by the temporal processing unit, where if the number of the sampling pixel locations of which the combing intensity value obtained through calculation by the intensity calculating subunit is consecutively greater than a preset threshold exceeds a preset number, or the number of the sampling pixel locations of which the combing intensity value obtained through calculation by the intensity calculating subunit is consecutively less than a preset threshold exceeds a preset number, the combing determining subunit determines that combing exists in the temporal virtual field image obtained after the temporal deinterlacing by the temporal processing unit; or if the number of the sampling pixel locations of which the combing intensity value obtained through calculation by the intensity calculating subunit is consecutively greater than a preset threshold does not exceed a preset number, or the number of the sampling pixel locations of which the combing intensity value obtained through calculation by the intensity calculating subunit is consecutively less than a preset threshold does not exceed a preset number, the combing determining subunit determines that combing does not exist in the temporal virtual field image obtained after the temporal deinterlacing by the temporal processing unit.

With reference to the first or second possible implementation manner, in a third possible implementation manner, the video processing apparatus further includes the temporal processing unit is further configured to acquire motion information between the two field images of the interlaced frame image, which are acquired by the acquiring unit; and the detecting unit further includes a motion determining subunit configured to determine, according to the motion information acquired by the temporal processing unit, a motion state of the field images acquired by the acquiring unit; and a joint determining subunit configured to, when the combing determining subunit determines that combing exists, determine, in combination with a determining result of the motion state by the motion determining subunit, genuineness of the combing that exists as determined by the combing determining subunit, where if the motion determining subunit determines that the motion state is moving, the joint determining subunit determines that the combing that exists as determined by the combing determining subunit is genuine combing, and that combing exists in the temporal virtual field image obtained after the temporal deinterlacing by the temporal processing unit; or if the motion determining subunit determines that the motion state is still, the joint determining subunit determines that the combing that exists as determined by the combing determining subunit is pseudo combing, and that combing does not exist in the temporal virtual field image obtained after the temporal deinterlacing by the temporal processing unit.

With reference to the second aspect and any one of the first to third possible implementation manners of the second aspect, in a fourth possible implementation manner, the fusing unit is configured to, if the result of the directional combing detection by the detecting unit is that the combing exists, select the spatial virtual field image obtained after the spatial deinterlacing by the spatial processing unit, to be fused with the other field image acquired by the acquiring unit, to obtain the new image; or if the result of the directional combing detection by the detecting unit is that the combing does not exist, select the temporal virtual field image obtained after the temporal deinterlacing by the temporal processing unit, to be fused with the other field image acquired by the acquiring unit, to obtain the new image.

With reference to the second aspect and any possible implementation manner of the first to fourth possible implementation manners, in a fifth possible implementation manner, the field images include a top field image and a bottom field image.

With reference to the second aspect and any possible implementation manner of the first to fourth possible implementation manners, in a sixth possible implementation manner, the temporal processing unit is configured to perform field duplication deinterlacing on either field image in the two field images acquired by the acquiring unit, to obtain a temporal virtual field image, or, perform field averaging deinterlacing on either field image in the two field images acquired by the acquiring unit, to obtain a temporal virtual field image, or perform motion compensation deinterlacing on either field image in the two field images acquired by the acquiring unit, to obtain a temporal virtual field image.

With reference to the second aspect and any possible implementation manner of the first to fourth possible implementation manners, in a seventh possible implementation manner, the spatial deinterlacing includes spatial linear interpolation deinterlacing and spatial directional interpolation deinterlacing.

In the video processing method and apparatus provided in the embodiments of the present invention, two field images, including a top field image and a bottom field image, of an interlaced frame image in an interlaced video can be acquired, temporal deinterlacing is performed on either of the field images to obtain a temporal virtual field image, spatial deinterlacing is performed on the either field image to obtain a spatial virtual field image, directional combing detection is performed on the temporal virtual field image along a preset candidate combing detection direction with reference to the other field image in the interlaced frame image and it is determined whether combing exists, and according to a result of the directional combing detection, the temporal virtual field image or the spatial virtual field image is selected to be fused with the other field image to generate a new image, to ensure that there is neither loss nor combing in high-frequency signals in a perpendicular direction in a new image obtained after deinterlacing is performed on an interlaced frame image in an interlaced video.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
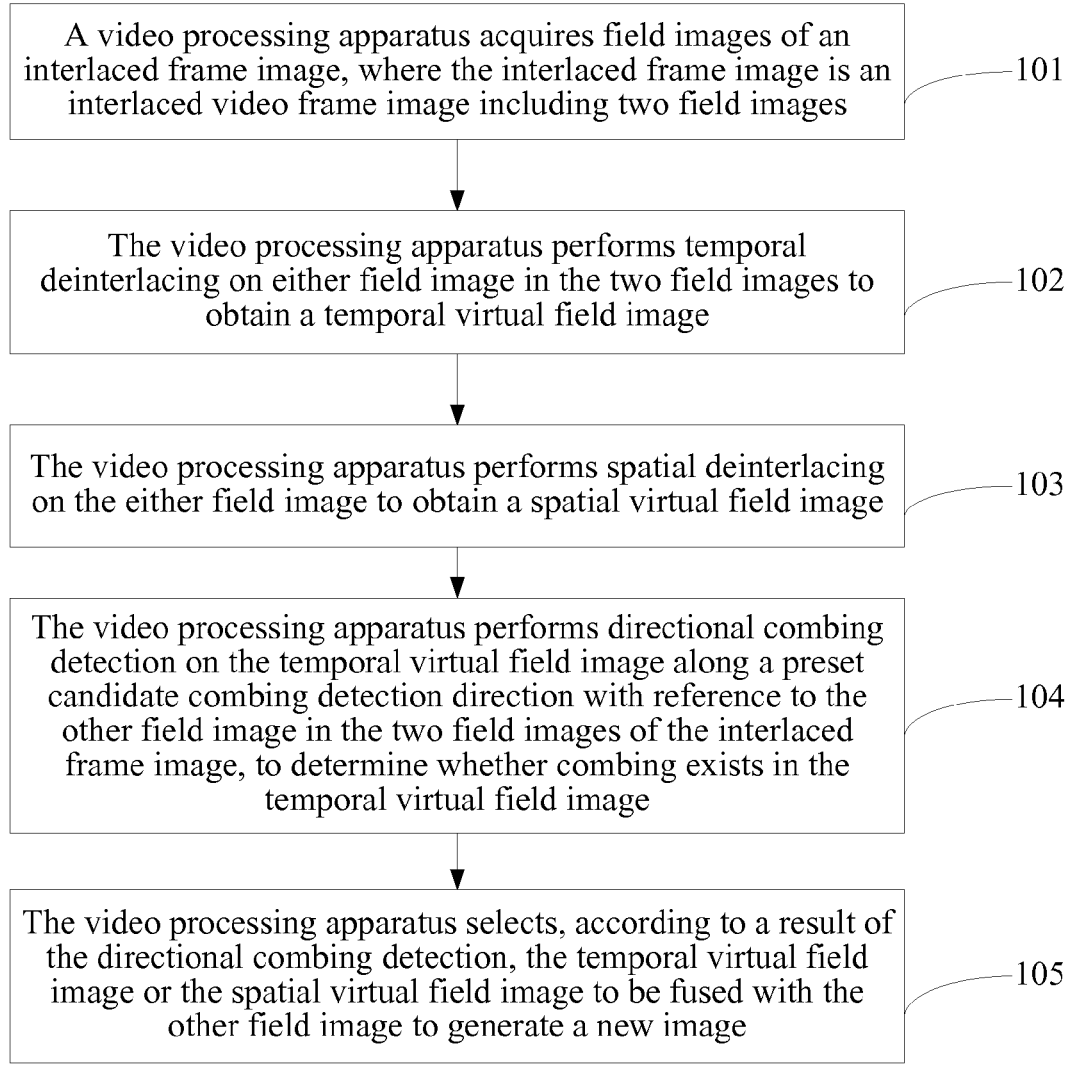
FIG. 1 is a schematic flowchart of a video processing method according to an embodiment of the present invention.

A video processing method provided in an embodiment of the present invention is used for image processing in the field of multimedia. A video processing method is provided to implement deinterlacing processing on an interlaced video, and referring to FIG. 1, the video processing method includes the following steps.

101. A video processing apparatus acquires field images of an interlaced frame image, where the interlaced frame image is an interlaced video frame image, and the interlaced video frame image includes two field images.

The field images include a top field image and a bottom field image.

102. The video processing apparatus performs temporal deinterlacing on either of the field images in the two field images to obtain a temporal virtual field image.

The temporal deinterlacing includes field duplication deinterlacing, field averaging deinterlacing, and motion compensation deinterlacing.

103. The video processing apparatus performs spatial deinterlacing on the either field image to obtain a spatial virtual field image.

The spatial deinterlacing includes spatial linear interpolation deinterlacing and spatial directional interpolation deinterlacing.

104. The video processing apparatus performs directional combing detection on the temporal virtual field image along a preset candidate combing detection direction with reference to the other field image in the two field images of the interlaced frame image, to determine whether combing exists in the temporal virtual field image.

105. The video processing apparatus selects, according to a result of the directional combing detection, the temporal virtual field image or the spatial virtual field image to be fused with the other field image to generate a new image.

The new image may be a progressive frame image that can be used in a progressive video of a progressive display.

In the video processing method provided in this embodiment of the present invention, a video processing apparatus can acquire two field images, including a top field image and a bottom field image, of an interlaced frame image in an interlaced video, perform temporal deinterlacing on either of the field images to obtain a temporal virtual field image, perform spatial deinterlacing on the either field image to obtain a spatial virtual field image, perform directional combing detection on the temporal virtual field image along a preset candidate combing detection direction with reference to the other field image in the interlaced frame image and determine whether combing exists, and according to a result of the directional combing detection, select the temporal virtual field image or the spatial virtual field image to be fused with the other field image to generate a new image, to ensure that there is neither loss nor combing in high-frequency signals in a perpendicular direction in a new image obtained after deinterlacing is performed on an interlaced frame image in an interlaced video.

Figure 2:
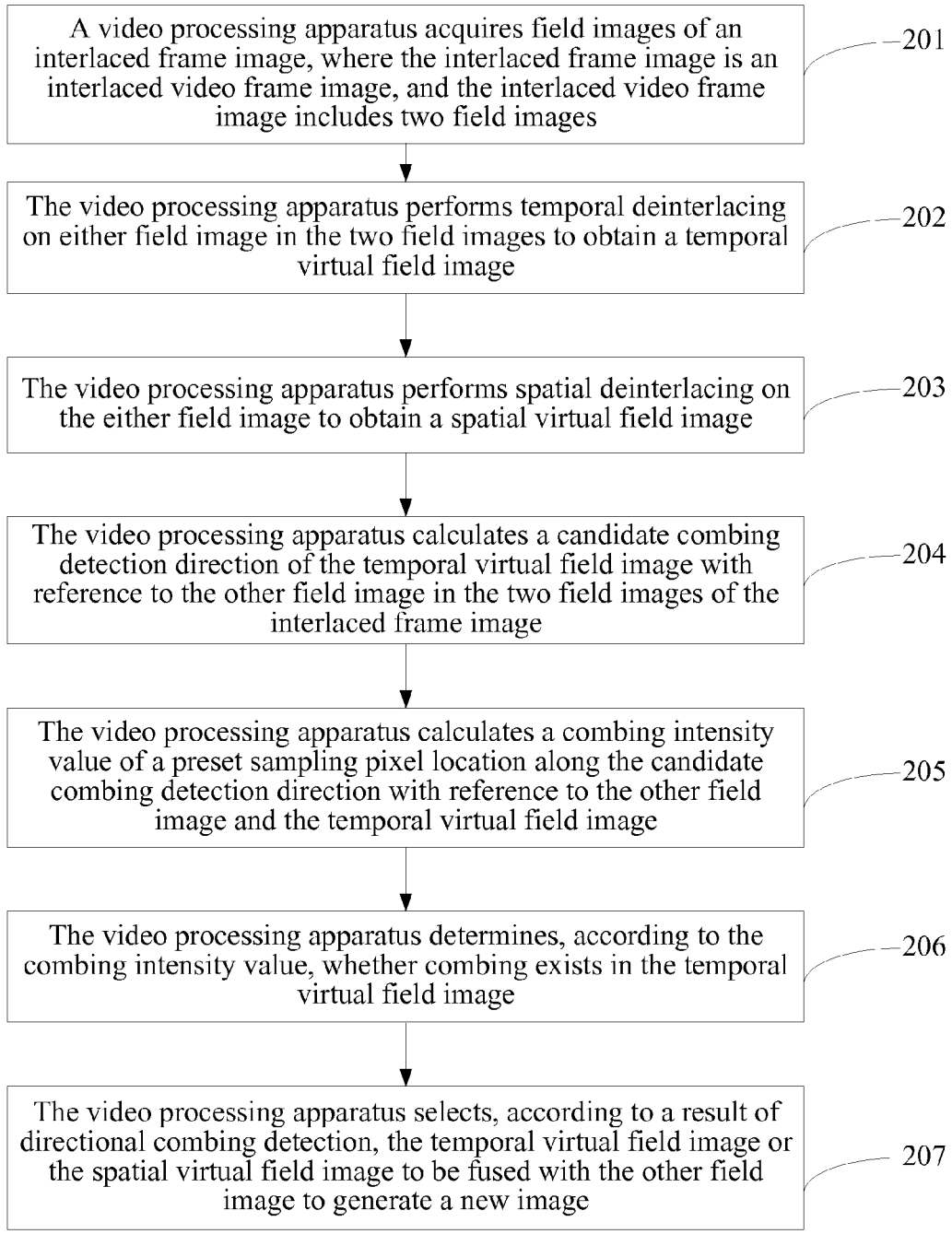
FIG. 2 is a schematic flowchart of a video processing method according to another embodiment of the present invention.

A video processing method provided in an embodiment of the present invention is used for image processing in the field of multimedia. A video processing method is provided to implement deinterlacing processing on an interlaced video, and referring to FIG. 2, the video processing method includes the following steps.

201. A video processing apparatus acquires field images of an interlaced frame image, where the interlaced frame image is an interlaced video frame image including two field images.

The field images include a top field image and a bottom field image.

202. The video processing apparatus performs temporal deinterlacing on either of the field images to obtain a temporal virtual field image.

The temporal deinterlacing includes field duplication deinterlacing, field averaging deinterlacing, and motion compensation deinterlacing. When the temporal deinterlacing method is an interpolation method, a field image in the interlaced video, which requires deinterlacing processing, is referred to as a field image for interpolation, a pixel in the field image for interpolation, which requires deinterlacing processing, is referred to as a pixel for interpolation, and a line in which the pixel for interpolation is located is referred to as a line for interpolation.

In a practical scenario, when temporal deinterlacing processing is performed on the interlaced video, when the field image for interpolation is the top field image, the temporal deinterlacing is performed on the top field image, and when the field image for interpolation is the bottom field image, the temporal deinterlacing is performed on the bottom field image.

203. The video processing apparatus performs spatial deinterlacing on the either field image to obtain a spatial virtual field image.

The spatial deinterlacing includes spatial linear interpolation deinterlacing and spatial directional interpolation deinterlacing. A field image in the interlaced video, which requires deinterlacing processing, is referred to as a field image for interpolation, a pixel in the field image for interpolation, which requires deinterlacing processing, is referred to as a pixel for interpolation, and a line in which the pixel for interpolation is located is referred to as a line for interpolation.

In a practical scenario, when spatial deinterlacing processing is performed on the interlaced video, when the field image for interpolation is the top field image, the spatial deinterlacing is performed on the top field image, and when the field image for interpolation is the bottom field image, the spatial deinterlacing is performed on the top field image.

204. The video processing apparatus calculates a candidate combing detection direction of the temporal virtual field image with reference to the other field image in the interlaced frame image.

The candidate combing detection direction includes an edge direction or a texture direction of each pixel location in the temporal virtual field image.

The candidate combing detection direction may be obtained by calculating a possible edge or texture direction (which may include one or more directions, and usually include a perpendicular direction) of each pixel location inside a field image (a top field image or a bottom field image) of the interlaced video for deinterlacing processing.

For example, in an algorithm for calculating an edge direction or a texture direction, a Sobel operator may be used to perform calculation to obtain a direction with steepest descent, that is, a normal direction of an edge. In the present invention, multiple candidate directions may be used for detection, and therefore a simple method of calculating an edge direction may be used.

Figure 3:
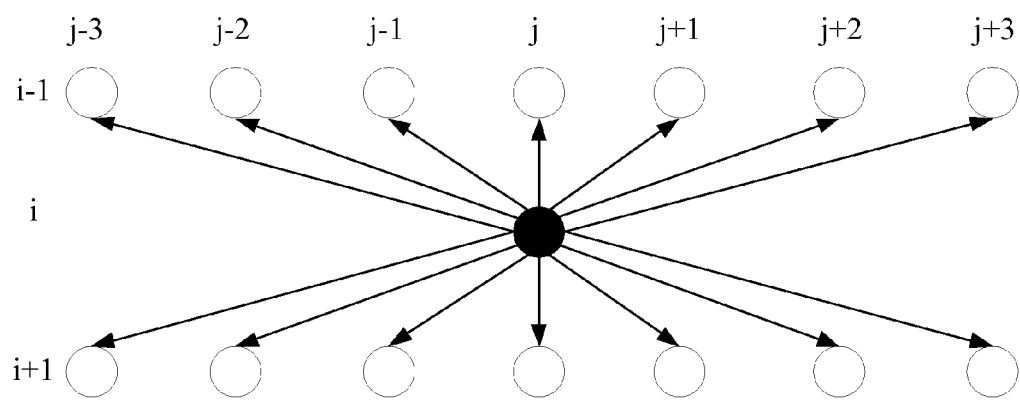
FIG. 3 is a schematic diagram of an algorithm for a video processing method according to an embodiment of the present invention.

Calculation of an edge direction is used as an example. As shown in FIG. 3, in combination with Formula (2-1) and Formula (2-2), where i, j, and k are integers, i and j are used to represent coordinates of a pixel location for interpolation, k represents the preset candidate combing detection direction, Y is a brightness parameter corresponding to the pixel location, and the $i^{th}$ line is a line for interpolation missing in the field image for interpolation, an edge direction t of a pixel location for interpolation whose coordinates are (i, j) in the field image for interpolation is:

$$t = \operatorname*{argmin}_{k \in C} E_k; \qquad (2\text{-}1)$$

$$E_k = |Y_{i-1,j-k} - Y_{i+1,j+k}|. \qquad (2\text{-}2)$$

Because an image may have very complex texture, simple calculation of an edge direction can hardly reflect a practical condition. In this case, the most possible three candidate combing detection directions may be obtained through calculation in three types of directions, respectively: 1. an approximately horizontal direction (k is an integer, and k>4 or k<−4); 2. a common angle direction (k is a non-zero integer and −4≤k≤4); and 3. an approximately perpendicular direction (k is a decimal number whose absolute value is less than 1).

In a practical application, another edge detection direction or a combined result of multiple edge detection directions may also be used as a candidate direction.

205. The video processing apparatus calculates a combing intensity value of a preset sampling pixel location along the candidate combing detection direction with reference to the other field image and the temporal virtual field image.

The combing in the interlaced video image is a repetitive "high-low-high" or "low-high-low" high-frequency phenomenon that appears in pixel brightness in a perpendicular direction or in an approximately perpendicular direction, and the combing may also exist in an approximately horizontal direction. A basis for detecting the combing is a combing intensity value that can represent such a repetitive "high-low-high" or "low-high-low" phenomenon that appears in pixel brightness.

The preset sampling pixel location refers to pixel locations at which sampling is performed sequentially along the candidate combing detection direction at a preset sampling proportion. The preset sampling pixel location may be all pixel locations in the candidate combing detection direction, or may be pixel locations at which sampling is performed at a preset interval.

With reference to Formula (2-3), Formula (2-4), and Formula (2-5), where i, j, and k are integers, i and j are used to represent coordinates of a pixel location for interpolation, k is the candidate combing detection direction, and Y is a brightness parameter corresponding to the pixel location, a combing intensity value $Q_k$ for denoting intensity of the combing is defined, and a calculation method is as follows:

$$Q_k = \begin{cases} 0 & Y_{i,j} \in [Y\text{min}, Y\text{max}] \\ Y_{i,j} - Y\text{min} & Y_{i,j} < Y\text{min} \\ Y_{i,j} - Y\text{min} & Y_{i,j} > Y\text{max} \end{cases} \quad (2\text{-}3)$$

where $$Y\text{max} = \max(Y_{i-1,j-k}, Y_{i+1,j+k}) \quad (2\text{-}4);$$

$$Y\text{min} = \min(Y_{i-1,j-k}, Y_{i+1,j+k}) \quad (2\text{-}5).$$

206. The video processing apparatus determines, according to the combing intensity value, whether combing exists in the temporal virtual field image.

In step 206, if the number of the sampling pixel locations of which the combing intensity value $Q_k$ is consecutively greater than a preset threshold Thr (usually Thr>0) or is consecutively less than a preset threshold −Thr exceeds a preset number, the video processing apparatus determines that combing exists in the temporal virtual field image; or if the number of the sampling pixel locations of which the combing intensity value $Q_k$ is consecutively greater than a preset threshold Thr or is consecutively less than a preset threshold −Thr does not exceed a preset number, the video processing apparatus determines that combing does not exist in the temporal virtual field image.

A simple expansion operation may further be performed on a detection result of the combing to further enhance accuracy of detection of the combing. That is, with reference to that if combing exists in an adjacent pixel within a neighborhood window (for example, a 3×3 window range) of the sampling pixel location, it is considered that currently weak combing also exists at the sampling pixel location. In this case, it may also be determined that combing exists in the temporal virtual field image having weak combing. Although complexity of an algorithm is increased, the accuracy of detection of the combing can be enhanced.

207. The video processing apparatus selects, according to a result of the directional combing detection, the temporal virtual field image or the spatial virtual field image to be fused with the other field image to generate a new image.

In step 207, if the result of the directional combing detection is that the combing exists, the video processing apparatus selects the spatial virtual field image to be fused with the other field image to obtain the new image; or if the result of the directional combing detection is that the combing does not exist, the video processing apparatus selects the temporal virtual field image to be fused with the other field image to obtain the new image. The new image may be a progressive frame image that can be used in a progressive video of a progressive display.

Optionally, in the present invention, multiple temporal deinterlacing operations may be performed at the same time, and the directional combing detection may be performed on temporal virtual field images obtained after the temporal deinterlacing.

An advantage of this measure lies in that multiple temporal virtual images obtained by temporal deinterlacing using multiple temporal deinterlacing methods are provided, so that a possibility of selecting the temporal virtual field image to be fused with the other field image can be increased, thereby better ensuring that there is neither loss nor combing in high-frequency signals in a perpendicular direction in the new image obtained after deinterlacing.

In the video processing method provided in this embodiment of the present invention, a video processing apparatus can acquire two field images, including a top field image and a bottom field image, of an interlaced frame image in an interlaced video, perform temporal deinterlacing on either of the field images to obtain a temporal virtual field image, perform spatial deinterlacing on the either field image to obtain a spatial virtual field image, perform directional combing detection on the temporal virtual field image along a preset candidate combing detection direction with reference to the other field image in the interlaced frame image and determine whether combing exists, and according to a result of the directional combing detection, select the temporal virtual field image or the spatial virtual field image to be fused with the other field image to generate a new image, to ensure that there is neither loss nor combing in high-frequency signals in a perpendicular direction in a new image obtained after deinterlacing is performed on an interlaced frame image in an interlaced video.

A video processing method provided in an embodiment of the present invention is used for image processing in the field of multimedia. A video processing method is provided to implement deinterlacing processing on an interlaced video, and referring to FIG. 4, the video processing method includes the following steps.

401. A video processing apparatus acquires field images of an interlaced frame image, where the interlaced frame image is an interlaced video frame image including two field images.

The field images include a top field image and a bottom field image.

402. The video processing apparatus performs temporal deinterlacing on either of the field images to obtain a temporal virtual field image.

The temporal deinterlacing includes field duplication deinterlacing, field averaging deinterlacing, and motion compensation deinterlacing. When the temporal deinterlacing method is an interpolation method, a field image in the interlaced video, which requires deinterlacing processing, is referred to as a field image for interpolation, a pixel in the field image for interpolation, which requires deinterlacing processing, is referred to as a pixel for interpolation, and a line in which the pixel for interpolation is located is referred to as a line for interpolation.

In a practical scenario, when temporal deinterlacing processing is performed on the interlaced video, when the field image for interpolation is the top field image, the temporal deinterlacing is performed on the top field image, and when the field image for interpolation is the bottom field image, the temporal deinterlacing is performed on the bottom field image.

403. The video processing apparatus performs spatial deinterlacing on the either field image to obtain a spatial virtual field image.

The spatial deinterlacing includes spatial linear interpolation deinterlacing and spatial directional interpolation deinterlacing. A field image in the interlaced video, which requires deinterlacing processing, is referred to as a field image for interpolation, a pixel in the field image for interpolation, which requires deinterlacing processing, is referred to as a pixel for interpolation, and a line in which the pixel for interpolation is located is referred to as a line for interpolation.

In a practical scenario, when spatial deinterlacing processing is performed on the interlaced video, when the field image for interpolation is the top field image, the spatial deinterlacing is performed on the top field image, and when the field image for interpolation is the bottom field image, the spatial deinterlacing is performed on the top field image.

404. The video processing apparatus acquires, from a spatial deinterlacing result of the either field image, an edge detection result of the spatial virtual field image as a candidate combing detection direction of the temporal virtual field image.

The candidate combing detection direction includes an edge direction or a texture direction of each pixel location in the temporal virtual field image. Because edge calculation needs to be performed during a spatial deinterlacing process of either of the field images, an edge feature or a texture feature contained in either of the field images can be acquired during edge calculation, where the edge feature is represented by an edge direction, and the texture feature is represented by a texture direction. Therefore, an edge direction or a texture direction generated during a spatial deinterlacing process of either of the field images is used as a candidate combing detection direction, thereby avoiding calculation of a candidate combing detection direction in an image on which temporal deinterlacing is performed, which can lower calculation complexity and further reduce chip design costs.

405. The video processing apparatus calculates a combing intensity value of a preset sampling pixel location along the candidate combing detection direction with reference to the other field image and the temporal virtual field image.

The combing in the interlaced video image is a repetitive "high-low-high" or "low-high-low" high-frequency phenomenon that appears in pixel brightness in a perpendicular direction or in an approximately perpendicular direction, and the combing may also exist in an approximately horizontal direction. A basis for detecting the combing is a combing intensity value that can represent such a repetitive "high-low-high" or "low-high-low" phenomenon that appears in pixel brightness.

The preset sampling pixel location refers to pixel locations at which sampling is performed sequentially along the candidate combing detection direction at a preset sampling proportion. The preset sampling pixel location may be all pixel locations in the candidate combing detection direction, or may be pixel locations at which sampling is performed at a preset interval.

With reference to Formula (4-1), Formula (4-2), and Formula (4-3), where i, j, and k are integers, i and j are used to represent coordinates of a pixel location for interpolation, k represents the candidate combing detection direction, and Y is a brightness parameter corresponding to the pixel location, a combing intensity value $Q_k$ for denoting the combing intensity is defined, and a calculation method is as follows:

$$Q_k = \begin{cases} 0 & Y_{i,j} \in [Y\min, Y\max] \\ Y_{i,j} - Y\min & Y_{i,j} < Y\min \\ Y_{i,j} - Y\min & Y_{i,j} > Y\max \end{cases} \quad (4\text{-}1)$$

where $$Y\max=\max(Y_{i-1,j-k}, Y_{i+1,j+k}) \quad (4\text{-}2);$$

$$Y\min=\min(Y_{i-1,j-k}, Y_{i+1,j+k}) \quad (4\text{-}3).$$

406. The video processing apparatus determines, according to the combing intensity value, whether combing exists in the temporal virtual field image.

In step 406, if the number of the sampling pixel locations of which the combing intensity value $Q_k$ is consecutively greater than a preset threshold Thr (usually Thr>0) exceeds a preset number or the number of the sampling pixel locations of which the combing intensity value $Q_k$ is consecutively less than a preset threshold −Thr exceeds a preset number, the video processing apparatus determines that combing exists in the temporal virtual field image; or if the number of the sampling pixel locations of which the combing intensity value $Q_k$ is consecutively greater than a preset threshold Thr does not exceed a preset number or the number of the sampling pixel locations of which the combing intensity value $Q_k$ is consecutively less than a preset threshold −Thr does not exceed a preset number, the video processing apparatus determines that combing does not exist in the temporal virtual field image.

A simple expansion operation may further be performed on a detection result of the combing to further enhance accuracy of detection of the combing. That is, with reference to that if combing exists in an adjacent pixel within a neighborhood window (for example, a 3×3 window range) of the sampling pixel location, it is considered that currently weak combing also exists at the sampling pixel location. In this case, it may also be determined that combing exists in the temporal virtual field image having weak combing. Although complexity of an algorithm is increased, the accuracy of detection of the combing can be enhanced.

407. The video processing apparatus selects, according to a result of the directional combing detection, the temporal virtual field image or the spatial virtual field image to be fused with the other field image to generate a new image.

In step 407, if the detection result is that the combing exists, the video processing apparatus selects the spatial virtual field image to be fused with the other field image to obtain the new image; or if the detection result is that the combing does not exist, the video processing apparatus selects the temporal virtual field image to be fused with the other field image to obtain the new image.

The new image may be a progressive frame image that can be used in a progressive video of a progressive display.

Optionally, in the present invention, multiple temporal deinterlacing operations may be performed at the same time, and the directional combing detection may be performed on temporal virtual field images obtained after the temporal deinterlacing.

An advantage of this measure lies in that multiple temporal virtual images obtained by temporal deinterlacing using multiple temporal deinterlacing methods are provided, so that a possibility of selecting the temporal virtual field image to be fused with the other field image can be increased, thereby better ensuring that there is neither loss nor combing in high-frequency signals in a perpendicular direction in the new image obtained after deinterlacing.

In the video processing method provided in this embodiment of the present invention, a video processing apparatus can acquire two field images, including a top field image and a bottom field image, of an interlaced frame image in an interlaced video, perform temporal deinterlacing on either of the field images to obtain a temporal virtual field image, perform spatial deinterlacing on the either field image to obtain a spatial virtual field image and a candidate detection direction, perform directional combing detection on the temporal virtual field image along the candidate combing detection direction with reference to the other field image in the interlaced frame image and determine whether combing exists, and according to a result of the directional combing detection, select the temporal virtual field image or the spatial virtual field image to be fused with the other field image to generate a new image, to ensure that there is neither loss nor combing in high-frequency signals in a perpendicular direction in a new image obtained after deinterlacing is performed on an interlaced frame image in an interlaced video.

Figure 5:
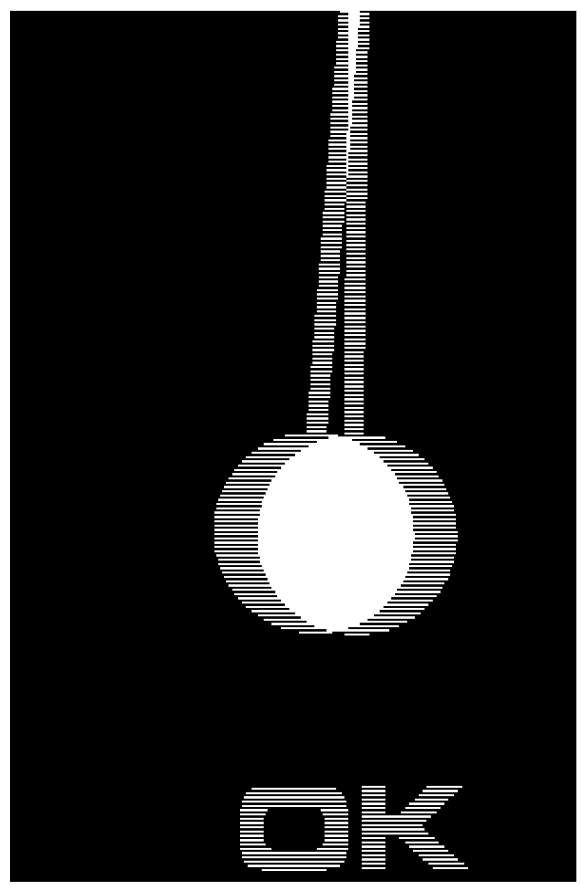
FIG. 5 is a schematic diagram of a processing object in a video processing method according to an embodiment of the present invention.
Figure 6:
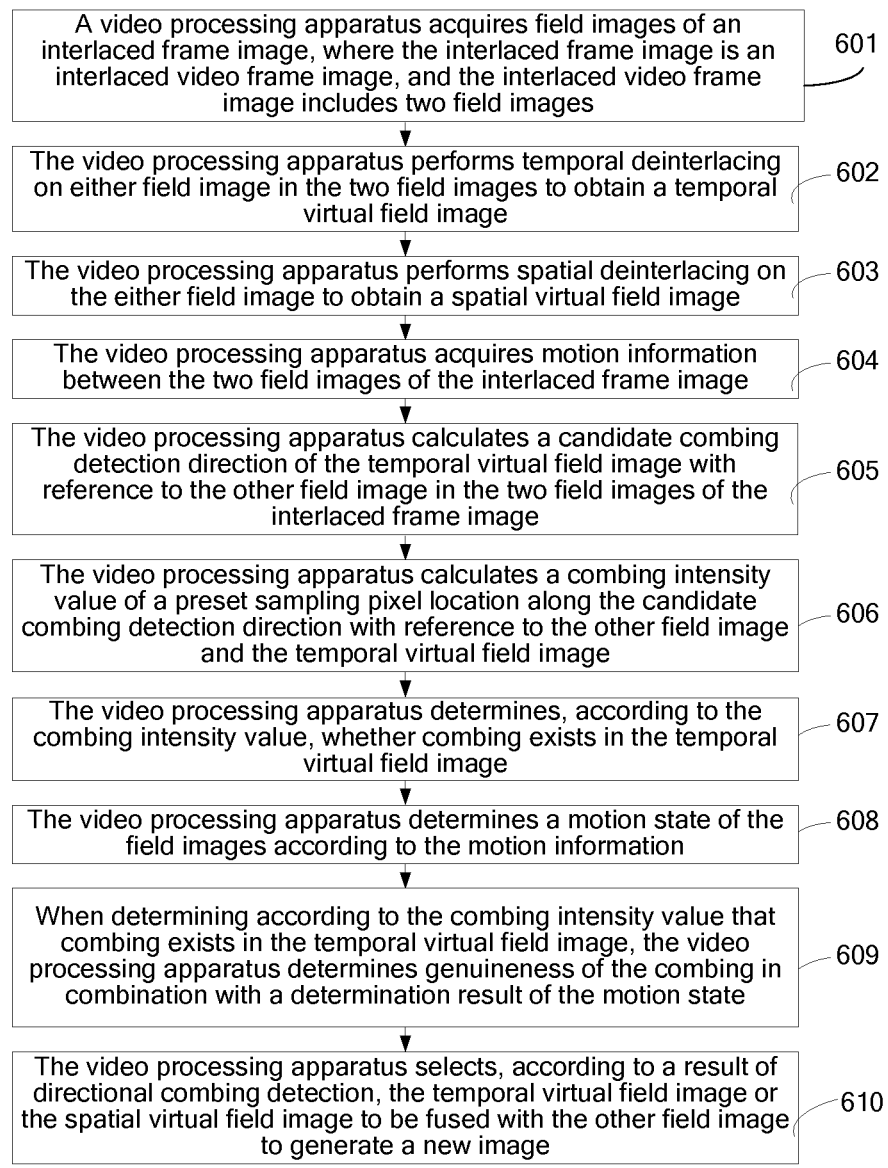
FIG. 6 is a schematic flowchart of a video processing method according to yet another embodiment of the present invention.

A video processing method provided in an embodiment of the present invention is used for image processing in the field of multimedia. A video processing method is provided to implement deinterlacing processing on an interlaced video, where the interlaced video is a computer generated picture shown in FIG. 5, and referring to FIG. 6, the video processing method includes the following steps.

601. A video processing apparatus acquires field images of an interlaced frame image, where the interlaced frame image is an interlaced video frame image including two field images.

The field images include a top field image and a bottom field image.

602. The video processing apparatus performs temporal deinterlacing on either of the field images to obtain a temporal virtual field image.

The temporal deinterlacing includes field duplication deinterlacing, field averaging deinterlacing, and motion compensation deinterlacing. When the temporal deinterlacing method is an interpolation method, a field image in the interlaced video, which requires deinterlacing processing, is referred to as a field image for interpolation, a pixel in the field image for interpolation, which requires deinterlacing processing, is referred to as a pixel for interpolation, and a line in which the pixel for interpolation is located is referred to as a line for interpolation.

In a practical scenario, when temporal deinterlacing processing is performed on the interlaced video, when the field image for interpolation is the top field image, the temporal deinterlacing is performed on the top field image, and when the field image for interpolation is the bottom field image, the temporal deinterlacing is performed on the bottom field image.

603. The video processing apparatus performs spatial deinterlacing on the either field image to obtain a spatial virtual field image.

Specifically, the spatial deinterlacing includes spatial linear interpolation deinterlacing and spatial directional interpolation deinterlacing. A field image in the interlaced video, which requires deinterlacing processing, is referred to as a field image for interpolation, a pixel in the field image for interpolation, which requires deinterlacing processing, is referred to as a pixel for interpolation, and a line in which the pixel for interpolation is located is referred to as a line for interpolation.

In a practical scenario, when spatial deinterlacing processing is performed on the interlaced video, when the field image for interpolation is the top field image, the spatial deinterlacing is performed on the top field image, and when the field image for interpolation is the bottom field image, the spatial deinterlacing is performed on the top field image.

604. The video processing apparatus acquires motion information between the two field images of the interlaced frame image.

The motion information is usually generated during a temporal deinterlacing process by the video processing apparatus, or may be generated with reference to a top field same-polarity field difference and bottom field same-polarity field difference during the temporal deinterlacing process.

605. The video processing apparatus calculates a candidate combing detection direction of the temporal virtual field image with reference to the other field image in the interlaced frame image.

The candidate combing detection direction includes an edge direction or a texture direction of each pixel location in the temporal virtual field image.

The candidate combing detection direction may be obtained by calculating a possible edge or texture direction (which may include one or more directions, and usually include a perpendicular direction) of each pixel location inside a field image (a top field image or a bottom field image) of the interlaced video for deinterlacing processing.

For example, during calculation of an edge direction or a texture direction, a sobel operator may be used to perform calculation to obtain a direction with steepest descent, that is, a normal direction of an edge. In the present invention, multiple candidate directions may be used for detection, and therefore a simple method of calculating an edge direction may be used.

Calculation of an edge direction is used as an example. As shown in FIG. 3, in combination with Formula (6-1) and Formula (6-2), where i, j, and k are integers, i and j are used to represent coordinates of a pixel location for interpolation, k represents the preset candidate combing detection direction, Y is a brightness parameter corresponding to the pixel location, and the $i^{th}$ line is a line for interpolation missing in the field image for interpolation, an edge direction t of a pixel location for interpolation whose coordinates are (i, j) in the field image for interpolation is:

$$t = \operatorname*{argmin}_{k \in C} E_k; \qquad (6\text{-}1)$$

$$E_k = |Y_{i-1,j-k} - Y_{i+1,j+k}|. \qquad (6\text{-}2)$$

Because an image may have very complex texture, simple calculation of an edge direction can hardly reflect a practical condition. In this case, the most possible three candidate combing detection directions may be obtained through calculation in three types of directions, respectively: 1. an approximately horizontal direction (k is an integer, and k>4 or k<−4); 2. a common angle direction (k is a non-zero integer and −4≤k<=4); and 3. an approximately perpendicular direction (k is a decimal number whose absolute value is less than 1).

In a practical application, another edge detection direction or a combined result of multiple edge detection directions may also be used as a candidate direction.

Optionally, based on the method in step 404, the video processing apparatus may further acquire, from a spatial deinterlacing result of the either field image, an edge detection result of the spatial virtual field image as a candidate combing detection direction of the temporal virtual field image, and an advantage of this measure lies in that calculation complexity is lowered and chip design costs are further reduced.

606. The video processing apparatus calculates a combing intensity value of a preset sampling pixel location along the candidate combing detection direction with reference to the other field image and the temporal virtual field image.

The combing in the interlaced video image is a repetitive "high-low-high" or "low-high-low" high-frequency phenomenon that appears in pixel brightness in a perpendicular direction or in an approximately perpendicular direction, and the combing may also exist in an approximately horizontal direction. A basis for detecting the combing is a combing intensity value that can represent such a repetitive "high-low-high" or "low-high-low" phenomenon that appears in pixel brightness.

The preset sampling pixel location refers to pixel locations at which sampling is performed sequentially along the candidate combing detection direction at a preset sampling proportion. The preset sampling pixel location may be all pixel locations in the candidate combing detection direction, or may be pixel locations at which sampling is performed at a preset interval.

With reference to Formula (6-3), Formula (6-4), and Formula (6-5), where i, j, and k are integers, i and j are used to represent coordinates of a pixel location for interpolation, k is the candidate combing detection direction, and Y is a brightness parameter corresponding to the pixel location, a combing intensity value $Q_k$ for denoting the combing intensity is defined, and a calculation method is as follows:

$$Q_k = \begin{cases} 0 & Y_{i,j} \in [Y\min, Y\max] \\ Y_{i,j} - Y\min & Y_{i,j} < Y\min \\ Y_{i,j} - Y\min & Y_{i,j} > Y\max \end{cases} \quad (6\text{-}3)$$

where $$Y\max = \max(Y_{i-1,j-k}, Y_{i+1,j+k}) \quad (6\text{-}4);$$

$$Y\min = \min(Y_{i-1,j-k}, Y_{i+1,j+k}) \quad (6\text{-}5).$$

607. The video processing apparatus determines, according to the combing intensity value, whether combing exists in the temporal virtual field image.

In step 607, if the number of the sampling pixel locations of which the combing intensity value $Q_k$ is consecutively greater than a preset threshold Thr (usually Thr>0) exceeds a preset number or the number of the sampling pixel locations of which the combing intensity value $Q_k$ is consecutively less than a preset threshold −Thr exceeds a preset number, the video processing apparatus determines that combing exists in the temporal virtual field image; or if the number of the sampling pixel locations of which the combing intensity value $Q_k$ is consecutively greater than a preset threshold Thr does not exceed a preset number or the number of the sampling pixel locations of which the combing intensity value $Q_k$ is consecutively less than a preset threshold −Thr does not exceed a preset number, the video processing apparatus determines that combing does not exist in the temporal virtual field image.

A simple expansion operation may further be performed on a detection result of the combing to further enhance accuracy of detection of the combing. That is, with reference to that if combing exists in an adjacent pixel within a neighborhood window (for example, a 3×3 window range) of the sampling pixel location, it is considered that currently weak combing also exists at the sampling pixel location. In this case, it may also be determined that combing exists in the temporal virtual field image having weak combing. Although complexity of an algorithm is increased, the accuracy of detection of the combing can be enhanced.

608. The video processing apparatus determines a motion state of the field images according to the motion information.

609. When determining according to the combing intensity value that combing exists in the temporal virtual field image, the video processing apparatus determines genuineness of the combing in combination with a determining result of the motion state.

Figure 4:
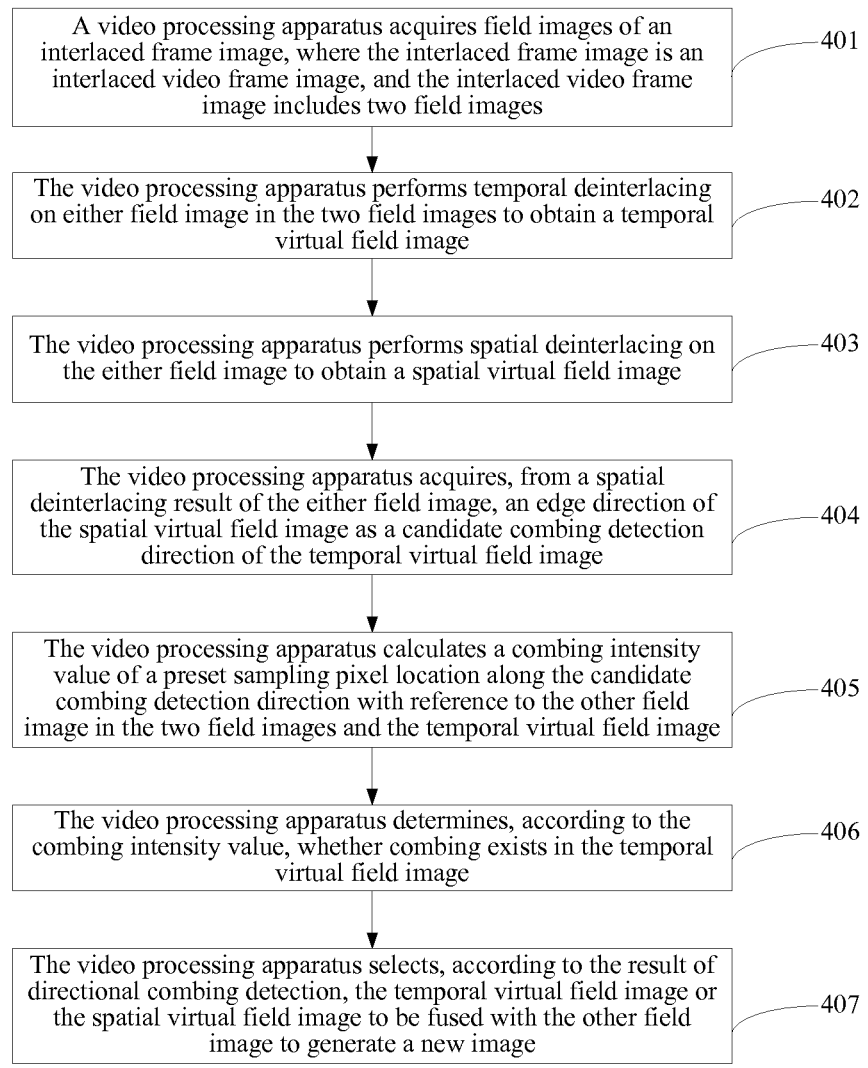
FIG. 4 is a schematic flowchart of a video processing method according to still another embodiment of the present invention.

A reason of this measure is that if an interlaced video that requires deinterlacing processing is a computer generated picture, motion information (moving or still) of a scenario needs to be added for joint determining. In this case, if the motion state of the scenario is still, it is combing in the video content, and it is not combing caused by deinterlacing processing performed on the interlaced video. For example, as shown in FIG. 4, a combing character "OK" is pseudo combing in the video content and is not genuine combing caused by deinterlacing processing performed on the interlaced video.

In step 609, if the motion state is moving, the video processing apparatus determines that the combing is genuine combing, and that the combing exists in the temporal virtual field image; or if the motion state is still, the video processing apparatus determines that the combing is pseudo combing, and that the combing does not exist in the temporal virtual field image.

610. The video processing apparatus selects, according to a result of the directional combing detection, the temporal virtual field image or the spatial virtual field image to be fused with the other field image to generate a new image.

In step 610, if the result of the directional combing detection is that the combing exists, the video processing apparatus selects the spatial virtual field image to be fused with the other field image to obtain the new image; or if the result of the directional combing detection is that the combing does not exist, the video processing apparatus selects the temporal virtual field image to be fused with the other field image to obtain the new image.

The new image may be a progressive frame image that can be used in a progressive video of a progressive display.

Optionally, in the present invention, multiple temporal deinterlacing operations may be performed at the same time, and the directional combing detection may be performed on temporal virtual field images obtained after the temporal deinterlacing.

An advantage of this measure lies in that multiple results of the directional combing detection can increase a possibility of selecting the temporal virtual field image to be fused with the other field image, thereby better ensuring that there is neither loss nor combing in high-frequency signals in a perpendicular direction in the new image obtained after deinterlacing.

In the video processing method provided in this embodiment of the present invention, a video processing apparatus can acquire two field images, including a top field image and a bottom field image, of an interlaced frame image in an interlaced video, perform temporal deinterlacing on either of the field images to obtain a temporal virtual field image and motion information of the field image, perform spatial deinterlacing to obtain a spatial virtual field image, perform directional combing detection on the temporal virtual field image along a preset candidate combing detection direction with reference to the motion information and the other field image in the interlaced frame image and determine whether combing exists, and according to a result of the directional combing detection, select the temporal virtual field image or the spatial virtual field image to be fused with the other field image to generate a new image, to ensure that there is neither loss nor combing in high-frequency signals in a perpendicular direction in a new image obtained after deinterlacing is performed on an interlaced frame image in an interlaced video.

Based on any video processing method in the foregoing provided in the embodiments of the present invention, an embodiment of the present invention provides a video processing method, which is used in a scenario in which a field for interpolation is a top field image T(n+1) at a moment n+1 during a deinterlacing processing process of an interlaced video, and includes the following steps:

First, the top field image T(n+1) at the moment n+1 of the interlaced video and a corresponding bottom field image B(n+1) are acquired.

Temporal deinterlacing is performed on the top field image T (n+1) to obtain a temporal virtual top field image T1($n+1$).

The temporal deinterlacing includes field duplication deinterlacing, field averaging deinterlacing, and motion compensation deinterlacing.

Spatial deinterlacing is also performed on the top field image T (n+1) to obtain a spatial virtual top field image T2($n+1$).

The spatial deinterlacing includes spatial linear interpolation deinterlacing and spatial directional interpolation deinterlacing.

Then, referring to Step 204, the video processing apparatus calculates a candidate combing detection direction of the temporal virtual top field image T1($n+1$) with reference to the bottom field image B(n+1), and the candidate combing detection direction includes an edge direction or a texture direction of each pixel location in the temporal virtual top field image T1($n+1$).

In a practical application, another edge detection direction or a combined result of multiple edge detection directions may also be used as a candidate direction.

Optionally, referring to step 404, the video processing apparatus may further acquire, from a spatial deinterlacing result of the top field image T (n+1), an edge detection result of the spatial virtual top field image T2($n+1$) as a candidate combing detection direction of the temporal virtual field image of the temporal virtual top field image T1($n+1$), and an advantage of this measure lies in that calculation complexity is lowered and chip design costs are further reduced.

Subsequently, referring to step 205, the video processing apparatus calculates a combing intensity value $Q_k$ of a preset sampling pixel location in the temporal virtual top field image T1 (n+1) along the candidate combing detection direction with reference to the bottom field image B(n+1).

Referring to step 206, according to the combing intensity value $Q_k$, it is detected whether combing exists in the temporal virtual top field image T1($n+1$).

Optionally, if an interlaced video that requires deinterlacing processing is a computer generated picture, motion information (moving or still) of a scenario needs to be added for joint determining. In this case, if the scenario is still, it is combing in the video content, and it is not combing caused by deinterlacing processing performed on the interlaced video. For example, as shown in FIG. 4, a combing character "OK" is pseudo combing in the video content, and is not genuine combing caused by deinterlacing processing performed on the interlaced video. In this case, image processing may be performed with reference to steps 604 to 609.

Finally, if combing exists in the virtual top field image T1($n+1$), the virtual top field image T2($n+1$) is selected to be fused with the bottom filed image B(n+1) to obtain the new image; or if combing does not exist in the virtual top field image T1($n+1$), the virtual top field image T1($n+1$) is selected to be fused with the bottom image B(n+1) to obtain the new image. The new image may be a progressive frame image that can be used in a progressive video of a progressive display.

Optionally, in the present invention, multiple temporal deinterlacing operations may be performed at the same time, and the directional combing detection may be performed on temporal virtual field images obtained after the temporal deinterlacing.

An advantage of this measure lies in that multiple temporal virtual images obtained by temporal deinterlacing using multiple temporal deinterlacing methods are provided, so that a possibility of selecting the temporal virtual field image to be fused with the other field image can be increased, thereby better ensuring that there is neither loss nor combing in high-frequency signals in a perpendicular direction in the new image obtained after deinterlacing.

In the video processing method provided in this embodiment of the present invention, a video processing apparatus can acquire two field images, including a top field image and a bottom field image, of an interlaced frame image in an interlaced video at a moment, perform temporal deinterlacing on the top field image to obtain a temporal virtual top field image, perform spatial deinterlacing to obtain a spatial virtual top field image, perform directional combing detection on the temporal virtual top field image along a preset candidate combing detection direction with reference to the bottom field image and determine whether combing exists, and according to a result of the directional combing detection, select the temporal virtual top field image or the spatial virtual top field image to be fused with the bottom field image to generate a new image, to ensure that there is neither loss nor combing in high-frequency signals in a perpendicular direction in a new image obtained after deinterlacing is performed on an interlaced frame image in an interlaced video.

Figure 7:
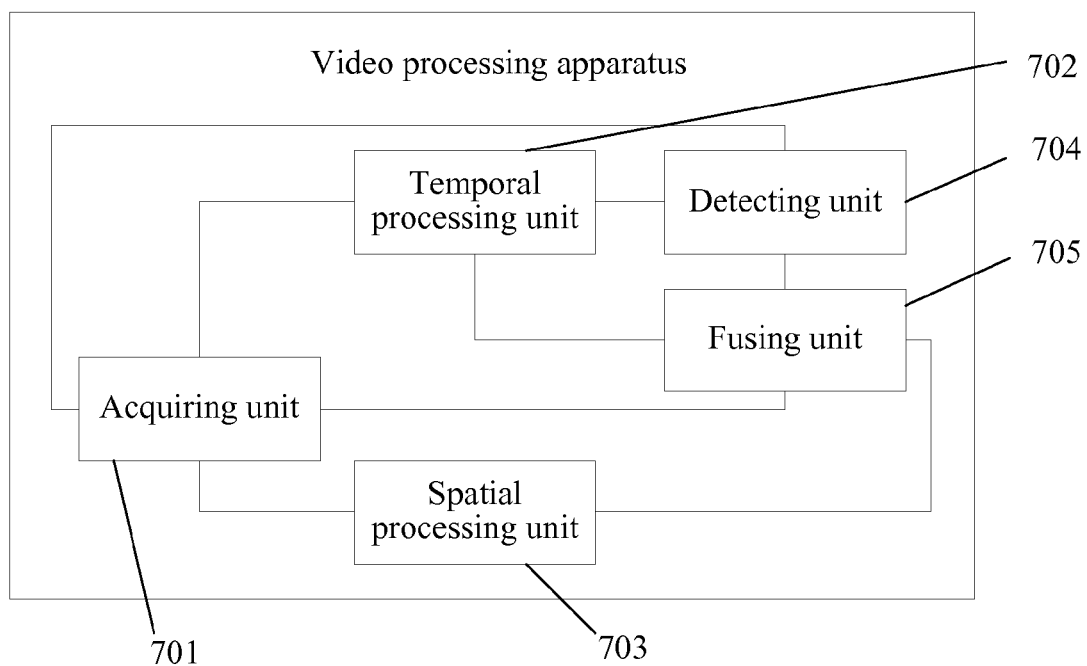
FIG. 7 is a schematic structural diagram of a video processing apparatus according to an embodiment of the present invention.

A video processing apparatus provided in an embodiment of the present invention is configured to implement the foregoing video processing method, and referring to FIG. 7, the video processing apparatus includes the following components.

An acquiring unit 701 is configured to acquire field images of an interlaced frame image, where the interlaced frame image is an interlaced video frame image including two field images.

The field images include a top field image and a bottom field image.

A temporal processing unit 702 is configured to perform temporal deinterlacing on either field image in the two field images acquired by the acquiring unit 701.

The temporal deinterlacing includes field duplication deinterlacing, field averaging deinterlacing, and motion compensation deinterlacing.

A spatial processing unit 703 is configured to perform spatial deinterlacing on the either field image acquired by the acquiring unit 701.

The spatial deinterlacing includes spatial linear interpolation deinterlacing and spatial directional interpolation deinterlacing.

A detecting unit 704 is configured to perform directional combing detection on the temporal virtual field image along a preset candidate combing detection direction with reference to the other field image in the two field images of the interlaced frame image, which are acquired by the acquiring unit 701, where the temporal virtual field image is obtained after the temporal deinterlacing by the temporal processing unit 702, to determine whether combing exists in the temporal virtual field image obtained after the temporal deinterlacing by the temporal processing unit 702.

A fusing unit 705 is configured to select, according to a result of the directional combing detection by the detecting unit 704, the temporal virtual field image obtained after the temporal deinterlacing by the temporal processing unit 702 or the spatial virtual field image obtained after the spatial deinterlacing by the spatial processing unit 703, to be fused with the other field image acquired by the acquiring unit 701, to generate a new image.

Figure 8:
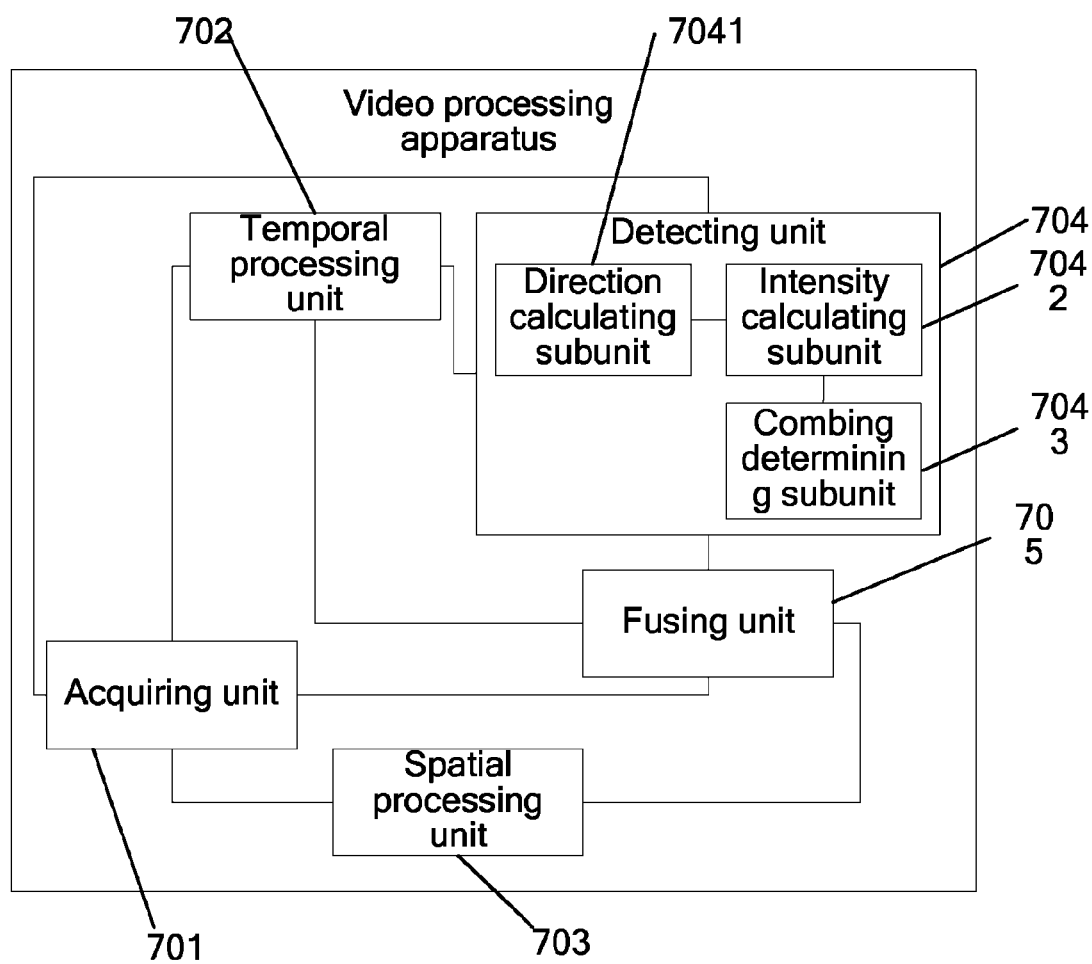
FIG. 8 is a schematic structural diagram of a video processing apparatus according to another embodiment of the present invention.

Optionally, referring to FIG. 8, the detecting unit 704 includes a direction calculating subunit 7041 configured to calculate, with reference to the other field image in the interlaced frame image acquired by the acquiring unit 701, a candidate combing detection direction of the temporal virtual field image obtained after the temporal deinterlacing by the temporal processing unit 702, where the candidate combing detection direction includes an edge direction or a texture direction of each pixel location in the temporal virtual field image obtained after the temporal deinterlacing by the temporal processing unit 702; an intensity calculating subunit 7042 configured to calculate a combing intensity value of a preset sampling pixel location along the candidate combing detection direction with reference to the other field image acquired by the acquiring unit 701 and the temporal virtual field image obtained after the temporal deinterlacing by the temporal processing unit 702, where the candidate combing detection direction is obtained through calculation by the direction calculating subunit 7041; and a combing determining subunit 7043 configured to determine, according to the combing intensity value obtained through calculation by the intensity calculating subunit 7042, whether combing exists in the temporal virtual field image obtained after the temporal deinterlacing by the temporal processing unit 702, where if the number of the sampling pixel locations of which the combing intensity value obtained through calculation by the intensity calculating subunit 7042 is consecutively greater than a preset threshold exceeds a preset number, or the number of the sampling pixel locations of which the combing intensity value obtained through calculation by the intensity calculating subunit 7042 is consecutively less than a preset threshold exceeds a preset number, the combing determining subunit 7043 determines that combing exists in the temporal virtual field image obtained after the temporal deinterlacing by the temporal processing unit 702; or if the number of the sampling pixel locations of which the combing intensity value obtained through calculation by the intensity calculating subunit 7042 is consecutively greater than a preset threshold does not exceed a preset number, or the number of the sampling pixel locations of which the combing intensity value obtained through calculation by the intensity calculating subunit 7042 is consecutively less than a preset threshold does not exceed a preset number, the combing determining subunit 7043 determines that combing does not exist in the temporal virtual field image obtained after the temporal deinterlacing by the temporal processing unit 702.

Figure 9:
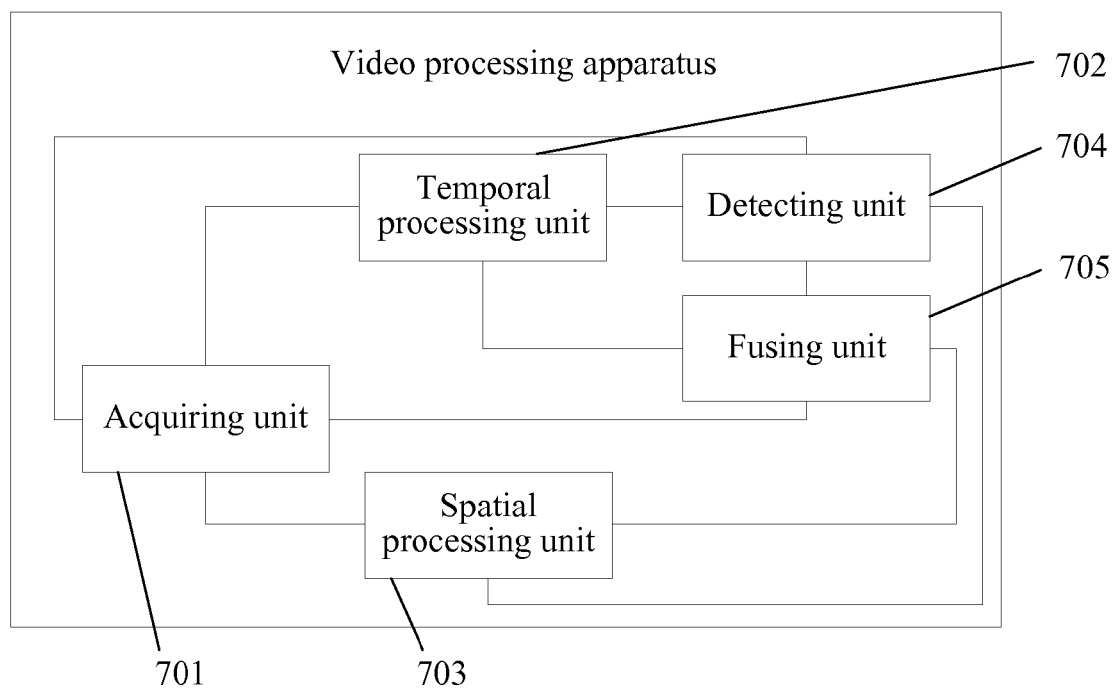
FIG. 9 is a schematic structural diagram of a video processing apparatus according to still another embodiment of the present invention.

Optionally, referring to FIG. 9, the video processing apparatus further includes the detecting unit 704 is further configured to perform directional combing detection on the temporal virtual field image along a preset candidate combing detection direction with reference to a spatial deinterlacing result of the either field image, which is obtained by the spatial processing unit 703, and the other field image in the interlaced frame image, which is acquired by the acquiring unit 701, to determine whether combing exists in the temporal virtual field image obtained after the temporal deinterlacing of the temporal processing unit 702, where the temporal virtual field image is obtained after the temporal deinterlacing by the temporal processing unit 702.

Figure 10:
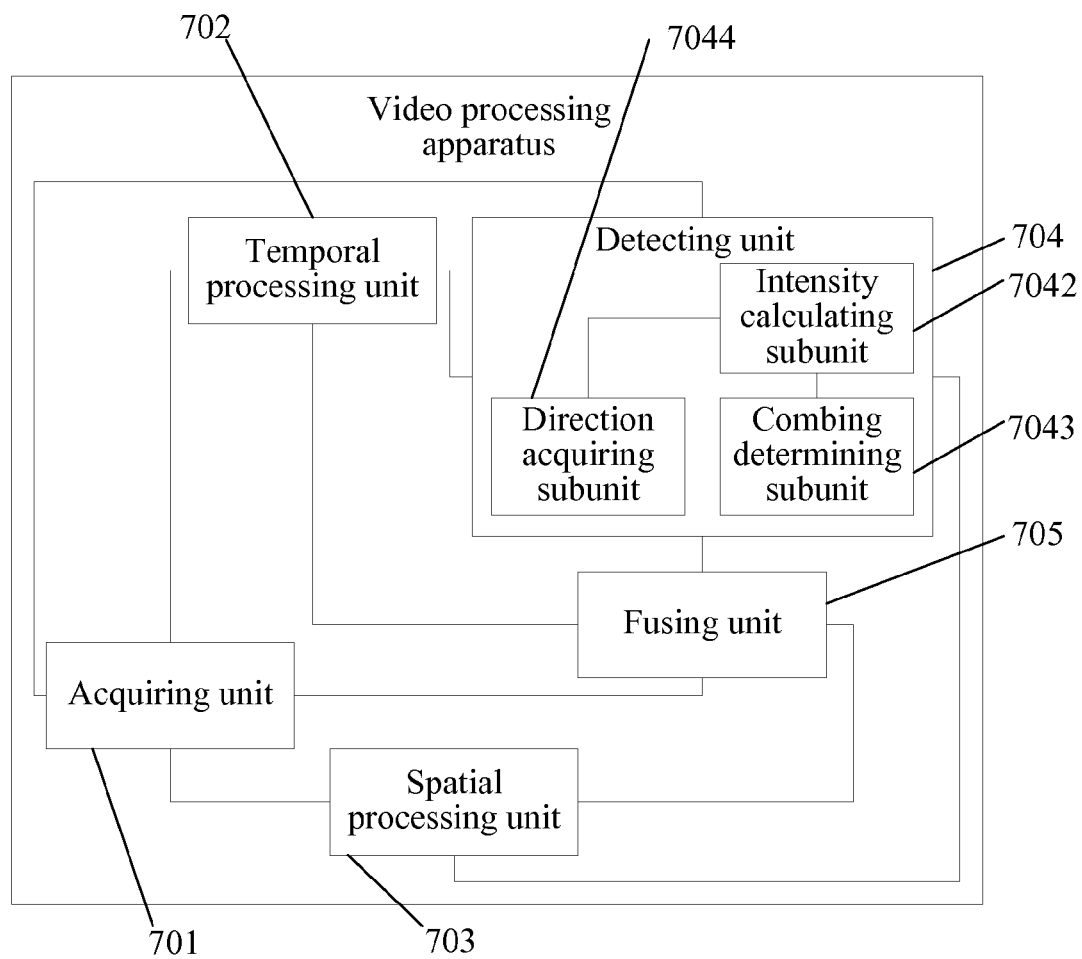
FIG. 10 is a schematic structural diagram of a video processing apparatus according to yet another embodiment of the present invention.

Optionally, referring to FIG. 10, the detecting unit 704 includes a direction acquiring subunit 7044 configured to acquire, from a spatial deinterlacing result of the either field image, which is obtained by the spatial processing unit 703, an edge direction of the spatial virtual field image as a candidate combing detection direction of the temporal virtual field image obtained after the temporal deinterlacing by the temporal processing unit 702, where the candidate combing detection direction includes an edge direction or a texture direction of each pixel location in the temporal virtual field image; an intensity calculating subunit 7042 configured to calculate a combing intensity value of a preset sampling pixel location along the candidate combing detection direction with reference to the other field image acquired by the acquiring unit 701 and the temporal virtual field image obtained after the temporal deinterlacing by the temporal processing unit 702, where the candidate combing detection direction is obtained by the spatial processing unit 703; and a combing determining subunit 7043 configured to determine, according to the combing intensity value obtained through calculation by the intensity calculating subunit 7042, whether combing exists in the temporal virtual field image obtained after the temporal deinterlacing by the temporal processing unit 702, where if the number of the sampling pixel locations of which the combing intensity value obtained through calculation by the intensity calculating subunit 7042 is consecutively greater than a preset threshold exceeds a preset number, or the number of the sampling pixel locations of which the combing intensity value obtained through calculation by the intensity calculating subunit 7042 is consecutively less than a preset threshold exceeds a preset number, the combing determining subunit 7043 determines that combing exists in the temporal virtual field image obtained after the temporal deinterlacing by the temporal processing unit 702; or if the number of the sampling pixel locations of which the combing intensity value obtained through calculation by the intensity calculating subunit 7042 is consecutively greater than a preset threshold does not exceed a preset number or the number of the sampling pixel locations of which the combing intensity value obtained through calculation by the intensity calculating subunit 7042 is consecutively less than a preset threshold does not exceed a preset number, the combing determining subunit 7043 determines that combing does not exist in the temporal virtual field image obtained after the temporal deinterlacing by the temporal processing unit 702.

Figure 11:
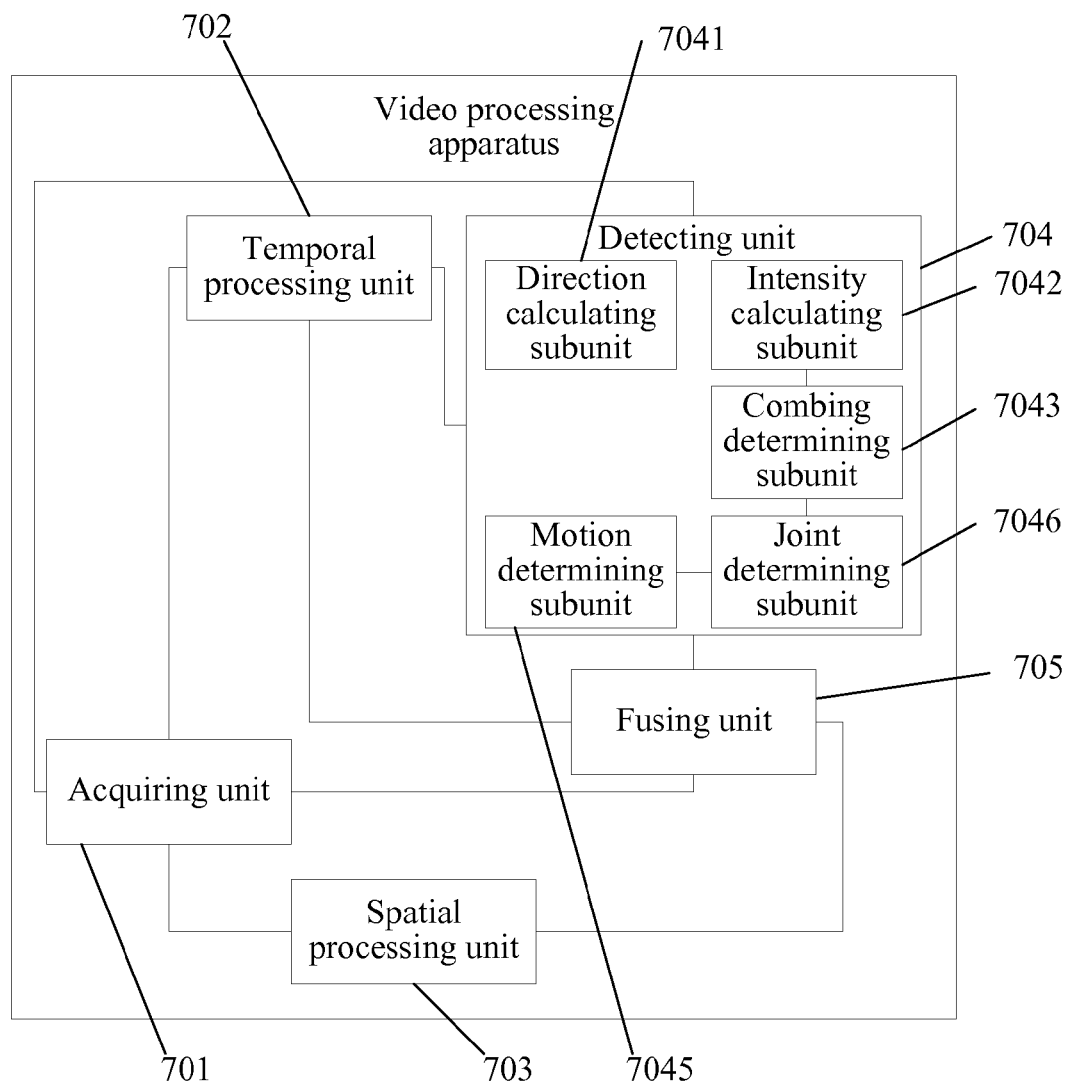
FIG. 11 is a schematic structural diagram of a video processing apparatus according to another embodiment of the present invention.
Figure 12:
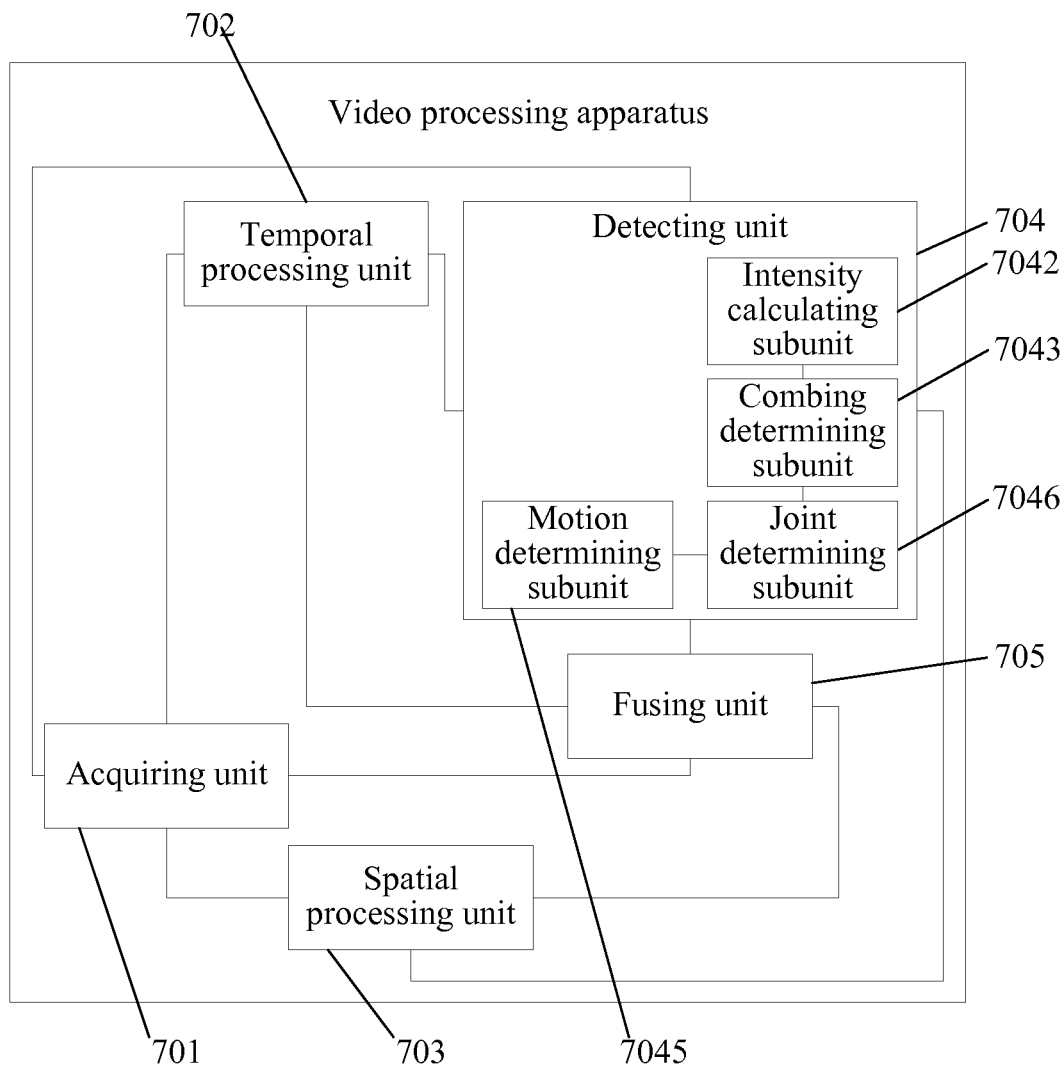
FIG. 12 is a schematic structural diagram of a video processing apparatus according to still another embodiment of the present invention.

Optionally, referring to FIG. 11 or FIG. 12, the video processing apparatus further includes the temporal processing unit 702 is further configured to acquire motion information between the two field images of the interlaced frame image, which are acquired by the acquiring unit 701.

The detecting unit 704 further includes a motion determining subunit 7045 configured to determine, according to the motion information acquired by the temporal processing unit 702, a motion state of the field images acquired by the acquiring unit 701; and a joint determining subunit 7046 configured to, when the combing determining subunit 7043 determines that combing exists, determine, in combination with a determining result of the motion state by the motion determining subunit 7045, genuineness of the combing that exists as determined by the combing determining subunit 7043, where if the motion determining subunit 7045 determines that the motion state is moving, the joint determining subunit 7046 determines that the combing that exists as determined by the combing determining subunit 7043 is genuine combing, and that the combing exists in the temporal virtual field image obtained after the temporal deinterlacing by the temporal processing unit 702; or if the motion determining subunit 7045 determines that the motion state is still, the joint determining subunit 7046 determines that the combing that exists as determined by the combing determining subunit 7043 is pseudo combing, and that the combing does not exist in the temporal virtual field image obtained after the temporal deinterlacing by the temporal processing unit 702.

The fusing unit 705 is configured to, if the result of the directional combing detection by the detecting unit 704 is that the combing exists, select the spatial virtual field image obtained after the spatial deinterlacing by the spatial processing unit 703, to be fused with the other field image acquired by the acquiring unit 701, to obtain the new image; or if the result of the directional combing detection by the detecting unit 704 is that the combing does not exist, select the temporal virtual field image obtained after the temporal deinterlacing by the temporal processing unit 702, to be fused with the other field image acquired by the acquiring unit 701, to obtain the new image.

The new image may be a progressive frame image that can be used in a progressive video of a progressive display.

Figure 13:
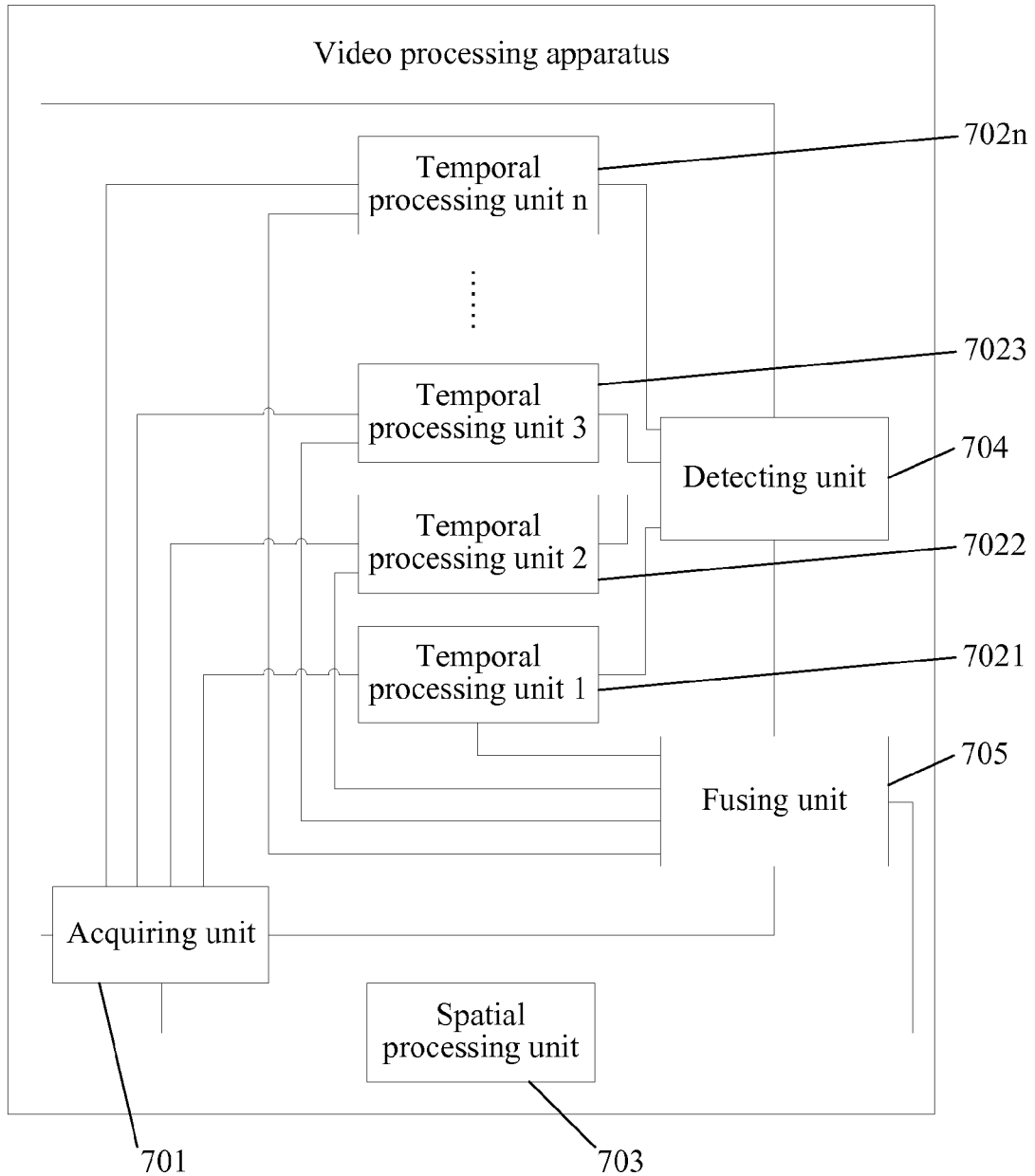
FIG. 13 is a schematic structural diagram of a video processing apparatus according to yet another embodiment of the present invention.

Optionally, as shown in FIG. 13, the video processing apparatus may be further implemented in the following manner, and includes multiple temporal processing units 7021-702n configured to perform, using different temporal deinterlacing methods, temporal deinterlacing on the field images acquired by the acquiring unit 701, to obtain multiple temporal virtual field images.

The temporal processing unit 702 may also be configured to perform, using multiple temporal deinterlacing methods, temporal deinterlacing on the field images acquired by the acquiring unit 701, to obtain multiple temporal virtual field images.

An advantage of this measure lies in that multiple temporal virtual images obtained by temporal deinterlacing using multiple temporal deinterlacing methods are provided, so that a possibility of selecting the temporal virtual field image to be fused with the other field image can be increased, thereby better ensuring that there is neither loss nor combing in high-frequency signals in a perpendicular direction in the new image obtained after deinterlacing.

The video processing apparatus provided in this embodiment of the present invention can acquire two field images, including a top field image and a bottom field image, of an interlaced frame image in an interlaced video, perform temporal deinterlacing on either of the field images to obtain a temporal virtual field image, perform spatial deinterlacing to obtain a spatial virtual field image, perform directional combing detection on the temporal virtual field image along a preset candidate combing detection direction with reference to the other field image in the interlaced frame image and determine whether combing exists, and according to a result of the directional combing detection, select the temporal virtual field image or the spatial virtual field image to be fused with the other field image to generate a new image, to ensure that there is neither loss nor combing in high-frequency signals in a perpendicular direction in a new image obtained after deinterlacing is performed on an interlaced frame image in an interlaced video.

Figure 14:
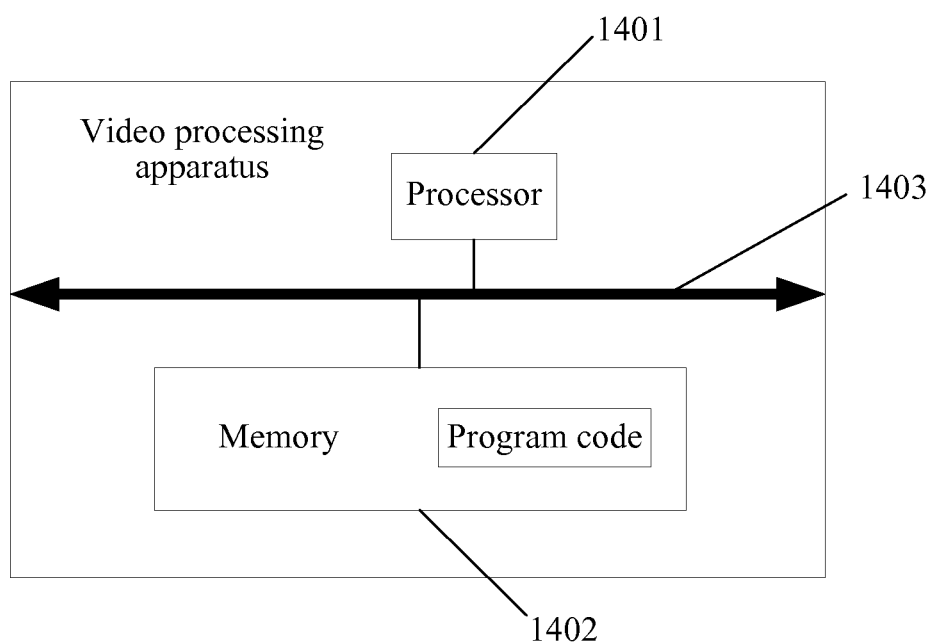
FIG. 14 is a schematic structural diagram of a video processing apparatus according to an embodiment of the present invention.

A video processing apparatus provided in an embodiment of the present invention, referring to FIG. 14, is configured to implement the foregoing video processing methods, and the video processing apparatus includes a processor 1401, a memory 1402, and a bus 1403, where the processor 1401 and the memory 1402 are connected through the bus 1403 to implement mutual communication, and the memory 1402 stores program code executed by the processor 1401.

The bus 1403 may be an Industry Standard Architecture (ISA) bus, a Peripheral Component Interconnect (PCI) bus, an Extended Industry Standard Architecture (EISA) bus, or the like, which is not limited herein. The bus 1403 may be classified into an address bus, a data bus, a control bus, and the like. For ease of representation, in FIG. 14, the bus 1403 is represented using only one thick line, which, however, does not represent that there is only one bus or one type of bus.

The memory 1402 is configured to store data or executable program code, where the program code includes a computer operation instruction, and may be an operating system, an application program, or the like. The memory 1402 may include a high-speed random-access memory (RAM) memory, or may further include a non-volatile memory, for example, at least one disk memory.

The processor 1401 may be a central processing unit (CPU), or an application specific integrated circuit (ASIC), or one or more integrated circuits configured to implement this embodiment of the present invention.

The processor 1401 is configured to implement the video processing methods in the foregoing embodiments by executing the program code in the memory 1402.

The processor 1401 is further configured to acquire field images of an interlaced frame image, where the interlaced frame image is an interlaced video frame image including two field images.

The field images include a top field image and a bottom field image.

The processor 1401 is further configured to perform temporal deinterlacing on either of the field images acquired by the processor 1401.

The temporal deinterlacing includes field duplication deinterlacing, field averaging deinterlacing, and motion compensation deinterlacing.

The processor 1401 is further configured to perform spatial deinterlacing on the either field image acquired by the processor 1401.

The spatial deinterlacing includes spatial linear interpolation deinterlacing and spatial directional interpolation deinterlacing.

The processor 1401 is further configured to perform directional combing detection on a temporal virtual field image along a preset candidate combing detection direction with reference to the other field image in the interlaced frame image, which is acquired by the processor 1401, to determine whether combing exists in the temporal virtual field image, where the temporal virtual field image is obtained after the temporal deinterlacing by the processor 1401.

The processor 1401 is further configured to select, according to a result of combing detection by the processor 1401, the temporal virtual field image obtained after the temporal deinterlacing by the processor 1401 or the spatial virtual field image obtained after the spatial deinterlacing by the processor 1401, to be fused with the other field image acquired by the processor 1401, to generate the new image.

Optionally, the processor 1401 is further configured to calculate, with reference to the other field image in the interlaced frame image, which is acquired by the processor 1401, a candidate combing detection direction of the temporal virtual field image obtained after the temporal deinterlacing by the processor 1401, where the candidate combing detection direction includes an edge direction or a texture direction of each pixel location in the temporal virtual field image obtained after the temporal deinterlacing by the processor 1401; the processor 1401 is further configured to calculate a combing intensity value of a preset sampling pixel location along the candidate combing detection direction with reference to the other field image acquired by the processor 1401 and the temporal virtual field image obtained after the temporal deinterlacing by the processor 1401, where the candidate combing detection direction is obtained through calculation by the processor 1401; and the processor 1401 is further configured to determine, according to the combing intensity value obtained through calculation by the processor 1401, whether combing exists in the temporal virtual field image obtained after the temporal deinterlacing by the processor 1401, where if the number of the sampling pixel locations of which the combing intensity value obtained through calculation by the processor 1401 is consecutively greater than a preset threshold or is consecutively less than a preset threshold exceeds a preset number, it is determined that combing exists in the temporal virtual field image; or if the number of the sampling pixel locations of which the combing intensity value obtained through calculation by the processor 1401 is consecutively greater than a preset threshold or is consecutively less than a preset threshold does not exceed a preset number, it is determined that combing does not exist in the temporal virtual field image.

Optionally, the processor 1401 is further configured to perform directional combing detection on the temporal virtual field image along a preset candidate combing detection direction with reference to a spatial deinterlacing result of the either field image, which is obtained by the processor 1401, and the other field image of the interlaced frame image, which is acquired by the processor 1401, to determine whether combing exists in the temporal virtual field image, where the temporal virtual field image is obtained after the temporal deinterlacing by the processor 1401.

Optionally, the processor 1401 is further configured to acquire, from a spatial deinterlacing result of the either field image, which is obtained by the processor 1401, an edge direction of the spatial virtual field image as a candidate combing detection direction of the temporal virtual field image obtained after the temporal deinterlacing by the processor 1401, where the candidate combing detection direction includes an edge direction or a texture direction of each pixel location in the temporal virtual field image; the processor 1401 is further configured to calculate a combing intensity value of a preset sampling pixel location along the candidate combing detection direction with reference to the other field image acquired by the processor 1401 and the temporal virtual field image obtained after the temporal deinterlacing by the processor 1401, where the candidate combing detection direction is obtained by the processor 1401; and the processor 1401 is further configured to determine, according to the combing intensity value obtained through calculation by the processor 1401, whether combing exists in the temporal virtual field image obtained after the temporal deinterlacing by the processor 1401, where if the number of the sampling pixel locations of which the combing intensity value obtained through calculation by the processor 1401 is consecutively greater than a preset threshold or is consecutively less than a preset threshold exceeds a preset number, it is determined that combing exists in the temporal virtual field image; or if the number of the sampling pixel locations of which the combing intensity value obtained through calculation by the processor 1401 is consecutively greater than a preset threshold or is consecutively less than a preset threshold does not exceed a preset number, it is determined that combing does not exist in the temporal virtual field image.

Optionally, the processor 1401 is further configured to acquire motion information between the two field images of the interlaced frame image, which are acquired by the processor 1401.

The processor 1401 is further configured to determine, according to the motion information acquired by the processor 1401, a motion state of the field images acquired by the processor 1401; and the processor 1401 is further configured to, when the processor 1401 determines that combing exists, determine, in combination with a determining result of the motion state by the processor 1401, genuineness of the combing that exists as determined by the processor 1401, to determine whether combing exists in the temporal virtual field image obtained after the temporal deinterlacing by the processor 1401, where if the processor 1401 determines that the motion state is moving, it is determined that the combing that exists as determined by the processor 1401 is genuine combing, and that the combing exists in the temporal virtual field image obtained after the temporal deinterlacing by the processor 1401; or if the processor 1401 determines that the motion state is still, it is determined that the combing that exists as determined by the processor 1401 is pseudo combing, and that the combing does not exist in the temporal virtual field image obtained after the temporal deinterlacing by the processor 1401.

The processor 1401 is configured to, if a result of the directional combing detection by the processor 1401 is that the combing exists, select the spatial virtual field image obtained after the spatial deinterlacing by the processor 1401, to be fused with the other field image acquired by the processor 1401, to obtain the new image; or if a result of the directional combing detection by the processor 1401 is that the combing does not exist, select the temporal virtual field image obtained after the temporal deinterlacing by the processor 1401, to be fused with the other field image acquired by the processor 1401, to obtain the new image.

The new image may be a progressive frame image that can be used in a progressive video of a progressive display.

Optionally, the processor 1401 is further configured to perform multiple times of temporal deinterlacing on the field images acquired by the processor 1401, to obtain temporal virtual field images.

The processor 1401 is further configured to perform directional combing detection on the multiple times of temporal virtual field images with reference to the field images acquired by the processor 1401, where the multiple times of temporal virtual field images are obtained after the multiple times of temporal deinterlacing by the processor 1401, to determine whether combing exist in the multiple times of temporal virtual field images.

The processor 1401 is further configured to select, according to a result of combing detection by the processor 1401, one of the temporal virtual field images obtained after the multiple times of temporal deinterlacing by the processor 1401 or the spatial virtual field image obtained after the spatial deinterlacing by the processor 1401, to be fused with the other field image acquired by the processor 1401, to generate the new image.

The video processing apparatus provided in this embodiment of the present invention can acquire two field images, including a top field image and a bottom field image, of an interlaced frame image in an interlaced video, perform temporal deinterlacing on either of the field images to obtain a temporal virtual field image, perform spatial deinterlacing to obtain a spatial virtual field image, perform directional combing detection on the temporal virtual field image along a preset candidate combing detection direction with reference to the other field image in the interlaced frame image and determine whether combing exists, and according to a result of the directional combing detection, select the temporal virtual field image or the spatial virtual field image to be fused with the other field image to generate a new image, to ensure that there is neither loss nor combing in high-frequency signals in a perpendicular direction in a new image obtained after deinterlacing is performed on an interlaced frame image in an interlaced video.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video processing method comprising:
    acquiring, by a video processing apparatus, field images of an interlaced frame image, wherein the interlaced frame image is an interlaced video frame image, and wherein the interlaced video frame image comprises two field images;
    performing, by the video processing apparatus, temporal deinterlacing on either field image in the two field images to obtain a temporal virtual field image;
    performing, by the video processing apparatus, spatial deinterlacing on the either field image to obtain a spatial virtual field image;
    performing, by the video processing apparatus, directional combing detection on the temporal virtual field image along a preset candidate combing detection direction with reference to the other field image in the two field images of the interlaced frame image, to determine whether combing exists in the temporal virtual field image; and
    selecting, by the video processing apparatus according to a result of the directional combing detection, the temporal virtual field image or the spatial virtual field image to be fused with the other field image to generate a new image.

2. The video processing method according to claim 1, wherein performing, by the video processing apparatus, directional combing detection on the temporal virtual field image along the preset candidate combing detection direction with reference to the other field image in the interlaced frame image, to determine whether combing exists in the temporal virtual field image comprises:
    calculating, by the video processing apparatus, a candidate combing detection direction of the temporal virtual field image with reference to the other field image in the interlaced frame image, wherein the candidate combing detection direction comprises an edge direction or a texture direction of each pixel location in the temporal virtual field image;
    calculating, by the video processing apparatus, a combing intensity value of a preset sampling pixel location along the candidate combing detection direction with reference to the other field image and the temporal virtual field image;
    determining, by the video processing apparatus according to the combing intensity value, whether combing exists in the temporal virtual field image;
    determining, by the video processing apparatus, that combing exists in the temporal virtual field image when the number of the sampling pixel locations of which the combing intensity value is consecutively greater than a preset threshold exceeds a preset number; and
    determining, by the video processing apparatus, that combing does not exist in the temporal virtual field image when the number of the sampling pixel locations of which the combing intensity value is consecutively greater than a preset threshold does not exceed a preset number.

3. The video processing method according to claim 1, wherein performing, by the video processing apparatus, directional combing detection on the temporal virtual field image along the preset candidate combing detection direction with reference to the other field image in the interlaced frame image, to determine whether combing exists in the temporal virtual field image comprises:
    acquiring, by the video processing apparatus from a spatial deinterlacing result of the either field image, an edge detection result of the spatial virtual field image as a candidate combing detection direction of the temporal virtual field image, wherein the candidate combing detection direction comprises an edge direction or a texture direction of each pixel location in the temporal virtual field image;
    calculating, by the video processing apparatus, a combing intensity value of a preset sampling pixel location along the candidate combing detection direction with reference to the other field image and the temporal virtual field image;
    determining, by the video processing apparatus, according to the combing intensity value, whether combing exists in the temporal virtual field image;
    determining, by the video processing apparatus, that combing exists in the temporal virtual field image when the number of the sampling pixel locations of which the combing intensity value is consecutively greater than a preset threshold exceeds a preset number; and
    determining, by the video processing apparatus, that combing does not exist in the temporal virtual field image when the number of the sampling pixel locations of which the combing intensity value is consecutively greater than a preset threshold does not exceed a preset number.

4. The video processing method according to claim 2, wherein before performing, by the video processing apparatus, directional combing detection on the temporal virtual field image along the preset candidate combing detection direction with reference to the other field image in the interlaced frame image, to determine whether combing exists in the temporal virtual field image, the method further comprises acquiring, by the video processing apparatus, motion information between the two field images of the interlaced frame image, and wherein performing, by the video processing apparatus, directional combing detection on the temporal virtual field image with reference to the other field image in the interlaced frame image, to determine whether combing exists in the temporal virtual field image further comprises:
- determining, by the video processing apparatus, a motion state of the field images according to the motion information;
- determining, by the video processing apparatus, genuineness of the combing in combination with a determining result of the motion state when the video processing apparatus determines according to the combing intensity value that combing exists in the temporal virtual field image;
- determining, by the video processing apparatus, that the combing is genuine combing when the motion state is moving, and that combing exists in the temporal virtual field image; and
- determining, by the video processing apparatus, that the combing is pseudo combing when the motion state is still, and that combing does not exist in the temporal virtual field image.

5. The video processing method according to claim 1, wherein selecting, by the video processing apparatus according to the result of the directional combing detection, the temporal virtual field image or the spatial virtual field image to be fused with the other field image to generate a new image comprises:
- selecting, by the video processing apparatus, the spatial virtual field image to be fused with the other field image to obtain the new image when the result of the directional combing detection is that the combing exists; and
- selecting, by the video processing apparatus, the temporal virtual field image to be fused with the other field image to obtain the new image when the result of the directional combing detection is that the combing does not exist.

6. The video processing method according to claim 1, wherein the field images comprise a top field image and a bottom field image.

7. The video processing method according to claim 1, wherein performing temporal deinterlacing on either field image in the two field images to obtain the temporal virtual field image comprises performing field duplication deinterlacing on either field image in the two field images to obtain a temporal virtual field image.

8. The video processing method according to claim 1, wherein the spatial deinterlacing comprises spatial linear interpolation deinterlacing and spatial directional interpolation deinterlacing.

9. A video processing apparatus comprising:
a processor configured to:
- acquire field images of an interlaced frame image, wherein the interlaced frame image is an interlaced video frame image, and wherein the interlaced video frame image comprises two field images;
- perform temporal deinterlacing on either field image in the two field images acquired to obtain a temporal virtual field image;
- perform spatial deinterlacing on the either field image acquired to obtain a spatial virtual field image;
- perform directional combing detection on the temporal virtual field image along a preset candidate combing detection direction with reference to the other field image in the two field images of the interlaced frame image, which are acquired to determine whether combing exists in the temporal virtual field image obtained after the temporal deinterlacing, wherein the temporal virtual field image is obtained after the temporal deinterlacing; and
- select, according to a result of the directional combing detection, the temporal virtual field image obtained after the temporal deinterlacing or the spatial virtual field image obtained after the spatial deinterlacing, to be fused with the other field image acquired, to generate a new image.

10. The video processing apparatus according to claim 9, wherein the processor is further configured to:
- calculate, with reference to the other field image in the interlaced frame image a candidate combing detection direction of the temporal virtual field image obtained after the temporal deinterlacing, wherein the candidate combing detection direction comprises an edge direction or a texture direction of each pixel location in the temporal virtual field image obtained after the temporal deinterlacing;
- calculate a combing intensity value of a preset sampling pixel location along the candidate combing detection direction with reference to the other field image and the temporal virtual field image obtained after the temporal deinterlacing, wherein the candidate combing detection direction is obtained through calculation;
- determine, according to the combing intensity value obtained through calculation, whether combing exists in the temporal virtual field image obtained after the temporal deinterlacing;
- determine that combing exists in the temporal virtual field image obtained after the temporal deinterlacing when the number of the sampling pixel locations of which the combing intensity value obtained through calculation is consecutively greater than a preset threshold exceeds a preset number, or when the number of the sampling pixel locations of which the combing intensity value obtained through calculation is consecutively less than a preset threshold exceeds a preset number; and
- determine that combing does not exist in the temporal virtual field image obtained after the temporal deinterlacing when the number of the sampling pixel locations of which the combing intensity value obtained through calculation is consecutively greater than a preset threshold does not exceed a preset number, or when the number of the sampling pixel locations of which the combing intensity value obtained through calculation is consecutively less than a preset threshold does not exceed a preset number.

11. The video processing apparatus according to claim 9, wherein the processor is further configured to:
- acquire, from a spatial deinterlacing result of either of the field images, an edge detection result of the spatial virtual field image as a candidate combing detection direction of the temporal virtual field image obtained after the temporal deinterlacing, wherein the candidate combing detection direction comprises an edge direction or a texture direction of each pixel location in the temporal virtual field image;
- calculate a combing intensity value of a preset sampling pixel location along the candidate combing detection direction with reference to the other field image and the temporal virtual field image obtained after the temporal deinterlacing, wherein the candidate combing detection direction is obtained;
- determine, according to the combing intensity value obtained through calculation, whether combing exists in the temporal virtual field image obtained after the temporal deinterlacing;

determine that combing exists in the temporal virtual field image obtained after the temporal deinterlacing when the number of the sampling pixel locations of which the combing intensity value obtained through calculation is consecutively greater than a preset threshold exceeds a preset number, or when the number of the sampling pixel locations of which the combing intensity value obtained through calculation is consecutively less than a preset threshold exceeds a preset number; and determine that combing does not exist in the temporal virtual field image obtained after the temporal deinterlacing when the number of the sampling pixel locations of which the combing intensity value obtained through calculation is consecutively greater than a preset threshold does not exceed a preset number, or when the number of the sampling pixel locations of which the combing intensity value obtained through calculation is consecutively less than a preset threshold does not exceed a preset number.

12. The video processing apparatus according to claim 9, wherein the processor further configured to:
    select the spatial virtual field image obtained after the spatial deinterlacing, to be fused with the other field image acquired, to obtain the new image when the result of the directional combing detection is that the combing exists; and
    select the temporal virtual field image obtained after the temporal deinterlacing, to be fused with the other field image acquired, to obtain the new image when the result of the directional combing detection is that the combing does not exist.

13. The video processing apparatus according to claim 9, wherein the field images comprise a top field image and a bottom field image.

14. The video processing apparatus according to claim 9, wherein the processor is further configured to:
    perform field duplication deinterlacing on either field image in the two field images acquired, to obtain a temporal virtual field image; or
    perform field averaging deinterlacing on either field image in the two field images acquired, to obtain a temporal virtual field image; or
    perform motion compensation deinterlacing on either field image in the two field images acquired, to obtain a temporal virtual field image.

15. The video processing apparatus according to claim 9, wherein the spatial deinterlacing comprises spatial linear interpolation deinterlacing and spatial directional interpolation deinterlacing.

* * * * *